United States Patent
Adachi et al.

(10) Patent No.: US 6,752,750 B2
(45) Date of Patent: Jun. 22, 2004

(54) TOOL, TOOL HOLDER, AND MACHINE TOOL

(75) Inventors: Sakashi Adachi, Shizuoka (JP); Koji Katsumata, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/270,248

(22) Filed: Oct. 15, 2002

(65) Prior Publication Data

US 2003/0073554 A1 Apr. 17, 2003

(30) Foreign Application Priority Data

| Oct. 15, 2001 | (JP) | ................................. 2001-317165 |
| Nov. 30, 2001 | (JP) | ................................. 2001-365920 |
| Nov. 30, 2001 | (JP) | ................................. 2001-367404 |
| Nov. 30, 2001 | (JP) | ................................. 2001-367428 |

(51) Int. Cl.$^7$ .................... B23Q 3/157; B23C 1/00
(52) U.S. Cl. .................... 483/31; 409/230; 409/231; 409/234; 408/124
(58) Field of Search ................. 409/230, 231, 409/234; 483/31; 408/124

(56) References Cited

U.S. PATENT DOCUMENTS

| 3,586,403 A | * | 6/1971 | Cooley ..................... 384/481 |
| 3,752,595 A | | 8/1973 | Woythal et al. |
| 3,814,892 A | * | 6/1974 | Inoue ..................... 219/69.15 |
| 4,077,736 A | | 3/1978 | Hutchens |
| 4,519,734 A | * | 5/1985 | Mitchell et al. ............ 409/231 |
| 4,534,686 A | * | 8/1985 | Nakamura et al. .......... 409/135 |
| 4,692,074 A | * | 9/1987 | Smith et al. ............... 409/233 |
| 4,716,657 A | | 1/1988 | Collingwood |
| 4,741,650 A | | 5/1988 | Nakata |
| 4,789,280 A | * | 12/1988 | Dobat et al. ............... 409/233 |
| 4,805,404 A | | 2/1989 | Dupin |
| 5,100,271 A | * | 3/1992 | Kameyama et al. ......... 409/231 |
| 5,290,130 A | * | 3/1994 | Beretta ..................... 409/131 |
| 5,564,872 A | | 10/1996 | Veil et al. |

(List continued on next page.)

FOREIGN PATENT DOCUMENTS

| GB | 2 014 332 | | 8/1979 | ................. 409/193 |
| JP | 63-109941 | | 5/1988 | ................. 409/231 |
| JP | 2001341045 A | * | 12/2001 | ............ B23Q/5/10 |
| JP | 2001347435 A | * | 12/2001 | ............ B23Q/5/04 |
| JP | 2002059331 A | * | 2/2002 | ............ B23Q/5/10 |

OTHER PUBLICATIONS

U.S. patent application Ser. No. 10/268,987, Kato, filed Oct. 11, 2002.
U.S. patent application Ser. No. 10/305,079, Watanabe, filed Nov. 27, 2002.
U.S. patent application Ser. No. 10/305,132, Katsumata et al., filed Nov. 27, 2002.
U.S. patent application Ser. No. 10/197,267, Katoh et al., filed Jul. 18, 2002.
U.S. patent application Ser. No. 10/268,932, Endo et al., filed Oct. 11, 2002.

*Primary Examiner*—A. L. Wellington
*Assistant Examiner*—Dana Ross
(74) *Attorney, Agent, or Firm*—Pillsbury Winthrop LLP

(57) ABSTRACT

A tool attachable to a spindle of a machine tool by an automatic tool changer in the same way as an ordinary tool, capable of being driven without connecting with an external power supply etc., and able to rotate at a rotational speed different from than that of the spindle of the machine tool without supply of electric power from the outside, provided with a machining tool for machining a workpiece, a motor connected with the machining tool and rotating the machining tool, and a generator to which rotary force is transmitted from the spindle of the machine tool and generating electric power to drive the motor, the shaft of the motor being arranged in an orientation different from the axial center of the spindle.

6 Claims, 16 Drawing Sheets

U.S. PATENT DOCUMENTS

| | | |
|---|---|---|
| 5,636,949 A | 6/1997 | Nakamura et al. |
| 5,697,739 A | 12/1997 | Lewis et al. |
| 5,759,000 A * | 6/1998 | Wawrzyniak et al. ....... 409/231 |
| 5,921,731 A * | 7/1999 | Chandrasekar .............. 409/231 |
| 6,264,409 B1 * | 7/2001 | Date et al. ................... 409/233 |
| 6,416,450 B2 * | 7/2002 | Susnjara ...................... 483/47 |
| 6,474,913 B2 * | 11/2002 | Katoh et al. ................. 409/131 |
| 2001/0049325 A1 | 12/2001 | Katoh et al. |

\* cited by examiner

FIG. 9
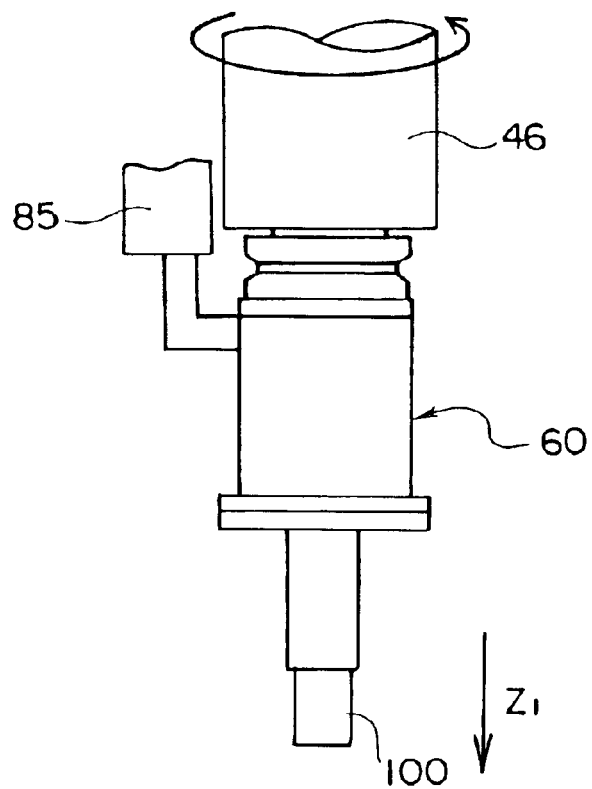
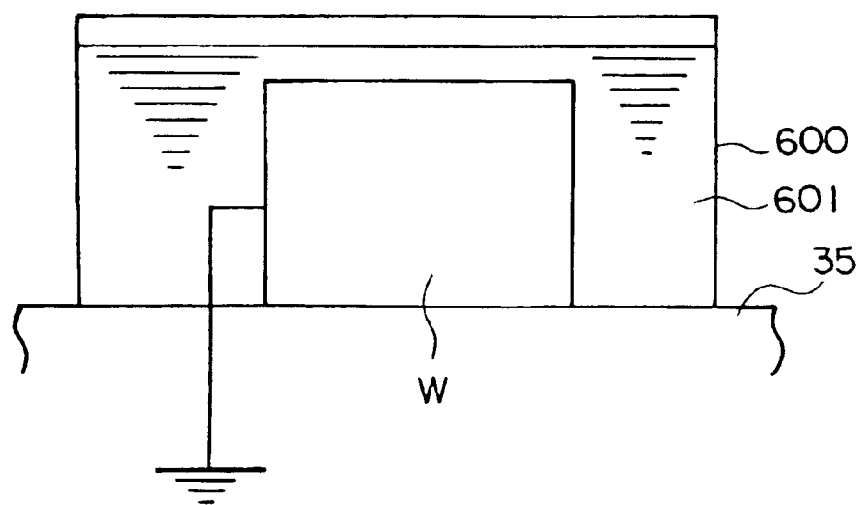

TOOL, TOOL HOLDER, AND MACHINE TOOL

BACKGROUND OF THE INVENTION

1. Field of the Invention

The present invention relates to a tool to be attached to a spindle of a machine tool for machining a workpiece.

2. Description of the Related Art

In, for example, a machining center or other machine tool provided with a spindle, the maximum rotational speed of the spindle (per unit time) is determined by the structure of a main bearing rotatably supporting the spindle and a lubrication system. For this reason, when rotation of a tool at a higher rotational speed than the maximum rotational speed of the spindle is desired, an accelerating apparatus is used.

An accelerating apparatus which holds the tool and is able to be attached to the spindle and which can increase the rotary force of the spindle by a gear mechanism such as epicyclic gearing to increase the rotational speed of the tool is known.

For example, in a machining center, when it is desired to increase the rotational speed of the tool to higher than the maximum speed of the spindle temporarily, such an accelerating apparatus is attached to the spindle in the same way as an ordinary tool to enable the tool to be rotated at a higher rotational speed.

However, when raising the rotational speed of the tool to a higher speed than the spindle by the above gear mechanism such as at a super high rotational speed such as tens of thousands to hundreds of thousands of revolutions per minute, the accelerating apparatus increasingly generates heat so the machining tolerance of a workpiece can be influenced by the heat. Further, at the above super high rotational speed, the noise from the accelerating apparatus can also increase. Furthermore, a highly reliable precision structure able to withstand the above super high rotational speed is required for the accelerating apparatus. Therefore, there is the disadvantage that the manufacturing cost becomes relatively high.

Further, in a case of an accelerating apparatus with a gear mechanism, it is necessary to lubricate the gear or bearing and arrange a supply passage and a discharge passage for the lubricating oil in the accelerating apparatus, so there is the disadvantage that the apparatus becomes larger and it is difficult to automatically change the tool by an automatic tool changer.

Further, as another accelerating method, sometimes the method is adopted of using a high frequency motor for the motor driving the tool and supplying drive current to this high frequency motor from a specially provided control apparatus so as to rotate the tool at a high speed. With this method, however, since there is a cable for supplying electric power from the outside, there are the disadvantages that it is difficult to automatically change tools like with an ordinary tool and the cost of the facilities is relatively high.

SUMMARY OF THE INVENTION

An object of the present invention is to provide a tool and a tool holder able to be attached to a spindle of a machine tool by an automatic tool changer in the same way as an ordinary tool, capable of operating without connection with an external power supply etc., and enabling tool rotation at a different rotational speed than that of the spindle of the machine tool without supplying electric power from the outside.

Another object of the present invention is to provide a machine tool not requiring the supply of electric power to an attachment using electric power attached to the machine tool body from an external power supply through a power feed cable.

Another object of the present invention is to provide a machine tool provided with the above tool and tool holder.

According to a first aspect of the present invention, there is provided a tool attachable to a spindle of a machine tool comprising a machining tool for machining a workpiece; a motor connected to the machining tool and causing the machining tool to rotate; and a generator to which rotary force is transmitted from a spindle of the machine tool and generating electric power to drive the motor; wherein a shaft of the motor is arranged in an orientation different from an axial center of the spindle.

Preferably, the tool is provided with a plurality of the motors and machining tools.

Preferably, the tool further comprises an attachment part attachable to the spindle and transmitting rotary force of the spindle to the motor and a case for holding the motor and generator, rotatably holding the attachment part, and engaging with a non-rotating portion of the machine tool so as to be restricted from rotation.

Preferably, the generator is an alternating current generator which supplies voltage of a frequency in accordance with the rotational speed of the spindle to the motor, and the motor is an induction motor rotating by the rotational speed in accordance with a frequency.

According to a second aspect of the invention, there is provided a tool holder able to hold a machining tool for machining a workpiece and attachable to a spindle of a machine tool body, comprising a tool holding part for rotatably holding the machining tool; a motor for rotating the tool holding part; and a generator to which rotary force is transmitted from a spindle of the machine tool and generating electric power to drive the motor; wherein a shaft of the motor is arranged in an orientation different from an axial center of the spindle.

Preferably, the tool holder is provided with a plurality of the motors and tool holding parts.

According to a third aspect of the present invention, there is provided a machine tool comprising a machine tool body provided with a spindle, a driving means for driving the spindle, and at least one control axis for changing a relative position between the spindle and a workpiece; a control apparatus for controlling the driving means and the control axis in accordance with a machining program; and an automatic tool changer provided with a plurality of types of tools and attaching a tool to the spindle; the plurality of types of tools each including a machining tool for machining a workpiece, a motor connected to the machining tool and rotating the machining tool, and a generator to which rotary force is transmitted from the spindle and generating electric power to drive the motor.

Preferably, the tools include a plurality of tools having different postures of shafts of the motors with respect to axial centers of the spindle.

Alternatively, the tools include tools provided with a plurality of motors and machining tools.

According to a fourth aspect of the present invention, there is provided a machine tool comprising a generator for generating electric power by power supplied from the outside and an electrodischarge machining electrode for performing electrodischarge machining using the electric power generated by the generator.

Preferably, the tool further comprises an attachment part able to be attached to a moving and positioning means for moving and positioning the electrodischarge machining electrode with respect to a workpiece to be machined by electrodischarge machining.

Alternatively, the tool further comprises an electrode holding means for exchangeably holding the electrodischarge machining electrode.

More preferably, the moving and positioning means is a machine tool able to cut a workpiece, and the generator generates electric power by power from a power source provided in the machine tool.

Still more preferably, the generator generates electric power by the transmission of rotary force of the spindle of the machine tool.

According to a fifth aspect of the present invention, there is provided an electrodischarge electrode holder comprising a generator for generating electric power by power supplied from the outside and a holding means for exchangeably holding an electrodischarge machining electrode for electrodischarge machining using electric power generated by the generator.

Preferably, the holder further comprises an attachment part able to be attached to a moving and positioning means for moving and positioning the electrodischarge machining electrode with respect to a workpiece to be machined by electrodischarge machining.

According to a sixth aspect of the present invention, there is provided a machine tool able to cut a workpiece, comprising a machine tool body moving and positioning a spindle with respect to a workpiece; a tool provided with a generator and an electrodischarge machining electrode for electrodischarge machining using electric power generated by the generator and able to be attached to the machine tool body; and a power source for supplying power to the generator.

Preferably, the power source is a drive motor for rotating the spindle.

According to a seventh aspect of the present invention, there is provided a tool able to be attached to a spindle of a machine tool, comprising a machining tool for machining a workpiece; a generator for generating electric power by rotary force supplied from the spindle of the machine tool; a motor drive by electric power generated by the generator and rotating the machining tool; and a cooling means for discharging to the outside heat generated by the operation of the motor using part of the electric power generated by the generator.

Preferably, the cooling means has a Peltier element.

According to an eighth aspect of the present invention, there is provided a tool holder able to hold a machining tool for machining a workpiece and able to be attached to a spindle of a machine tool body, comprising a tool holding part for rotatably holding the machining tool; a generator for generating electric power by rotary force supplied from the spindle of the machine tool; a motor drive by electric power generated by the generator and rotating the machining tool; and a cooling means for discharging to the outside heat generated by the operation of the motor using part of the electric power generated by the generator.

Preferably, the cooling means has a Peltier element.

According to a ninth aspect of the present invention, there is provided a machine tool comprising a machine tool body provided with a spindle, a drive means for driving the spindle, and at least one control axis for changing a relative position between the spindle and the work; a tool provided with a machining tool for machining a workpiece, a generator for generating electric power by rotary force supplied from the spindle of the machine tool, and a motor driven by electric power generated by the generator and rotating the machining tool and able to be attached to the spindle; and a control apparatus for controlling the drive of the drive means and the control axis in accordance with a machining program; the tool further having a cooling means for discharging to the outside heat generated by the operation of the motor using part of the electric power generated by the generator.

According to a 10th aspect of the present invention, there is provided a machine tool comprising a machine tool body; a power source provided at the machine tool body and supplying power required for machining the workpiece; a generator for generating electric power using part of the power supplied from the power source; and an attachment for the machine tool body using power generated by the generator.

Preferably, the attachment is provided with a motor driven using electric power generated by the generator and is attached to the machine tool body.

More preferably, the machine tool further comprises a connecting means for electrically connecting the generator and the motor by being attached in the machine tool body.

Preferably, the power source is a drive motor for driving a spindle rotatably held in a spindle housing of the machine tool body, and the generator is built into the spindle housing and generates electric power by rotation of the spindle.

More preferably, the attachment is rotated by said motor and has a tool for machining work.

In the first to third aspects of the present invention, a tool able to be attached to a spindle is provided with a generator and a motor, electric power is generated using the rotary force of the spindle, and the motor is operated by the generated electric power to rotate the machining tool. Due to this, the tool can be driven without connection to an external power supply etc., and automatic tool changing also becomes possible.

Further, it is possible to deal with various types of machining by providing various types of tools with different postures and numbers of motors in an automatic tool changer in advance.

In the fourth to sixth aspects of the present invention, a generator generates electric power by power supplied from the outside. By supplying the generated electric power to an electrodischarge machining electrode, electrodischarge machining becomes possible. By attaching this tool to for example a machine tool body or other moving and positioning means and moving and positioning the tool with respect to a workpiece, a workpiece can be machined by electrodischarge machining.

In the seventh to ninth aspects of the present invention, a tool able to be attached to a spindle is provided with a generator and a motor, electric power is generated using the rotary force of the spindle, and the motor is operated by the generated electric power to rotate the machining tool. Due to this, the tool can be driven without connection to an external power supply etc., and automatic tool changing also becomes possible.

The tool of the seventh aspect of the invention is completely independent from the spindle and any external apparatus, but generates heat when the motor is driven. Therefore, a cooling means is provided at the tool, and part of the electric power generated by the generator is used to discharge the heat generated by the operation of the motor. Due to this, it is possible to avoid the effects of heat generated by the operation of the motor and possible to maintain the properties of the tool of the present invention without requiring connection with the outside etc.

In the 10th aspect of the present invention, part of the power from a power source is supplied to a generator, whereupon the generator generates electric power. The power generated by this generator is used by an attachment. For example, when the attachment is provided with a motor, the motor is driven. By attaching the attachment with the built-in motor to a spindle housing of a machine tool body and rotating the tool by this motor, the workpiece can be cut by a tool rotating independently from the rotation of the spindle.

BRIEF DESCRIPTION OF THE DRAWINGS

These and other objects and features of the present invention will be more apparent from the following description of the preferred embodiments given in relation to the accompanying drawings, wherein:

FIG. 9 is a view for explaining the routine of electrodischarge machining using an electrodischarge machining tool;

DESCRIPTION OF THE PREFERRED EMBODIMENTS

Figure 1:
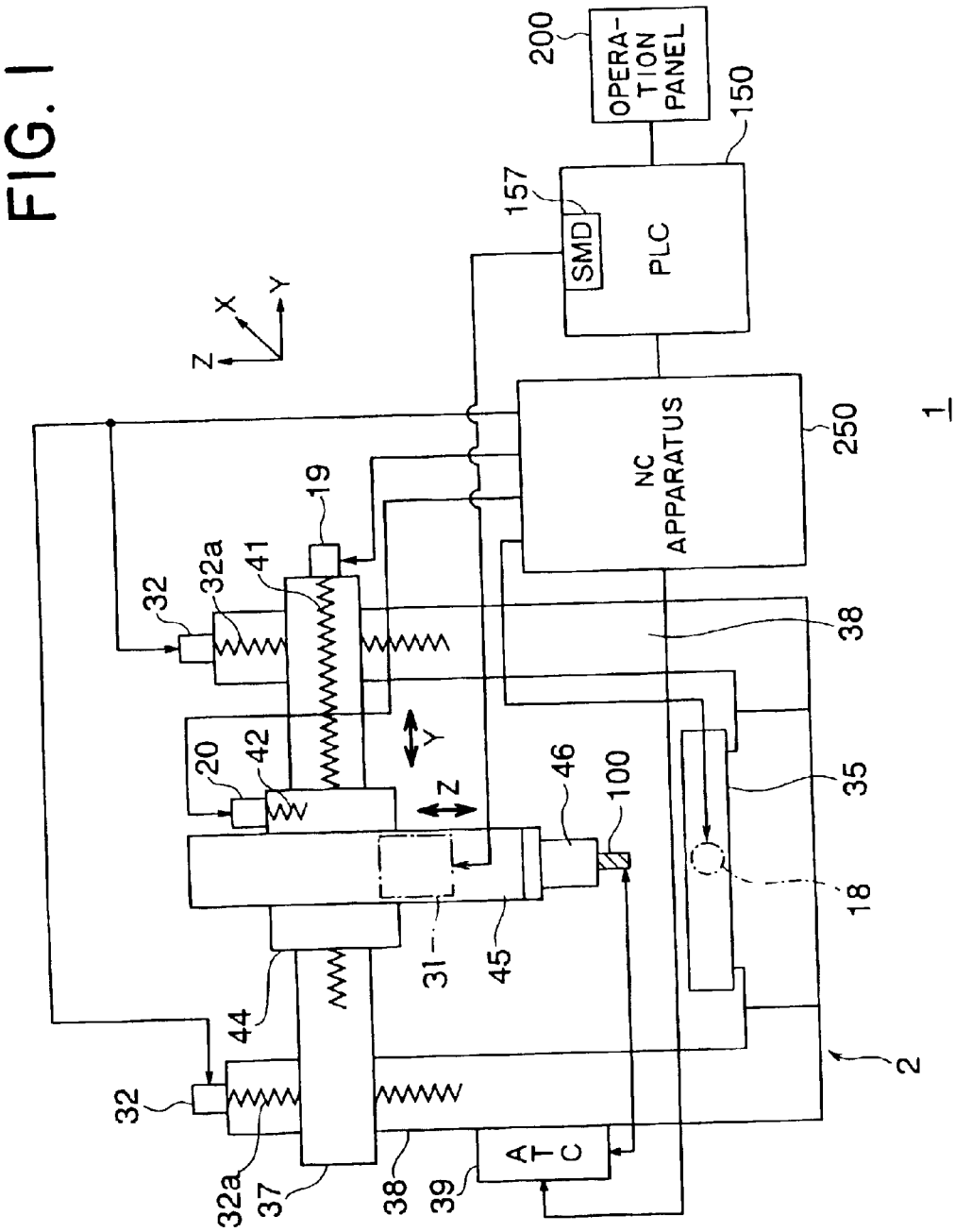
FIG. 1 is a view of the configuration of a machining center as an example of a machine tool to which the present invention is applied.

Below, an explanation will be made of embodiments of the present invention by referring to the drawings.

First Embodiment

FIG. 1 is a view of the configuration of a machining center as an example of a machine tool according to the present invention. Note that the machining center is a numerical control machine tool capable of so-called combined machining.

The machining center 1 is provided with a machine tool body 2, a numerical control apparatus (NC apparatus) 250, and a programmable logic controller (PLC) 150.

In FIG. 1, the machine tool body 2 is provided with a cross rail 37 having two ends movably supported by shafts of a double housing type column 38. A ram 45 is provided movably in a vertical direction (Z-axis direction) via a saddle 44 supported movably on this cross rail 37.

The saddle 44 is provided with a not illustrated nut part passing thorough the cross rail 37 in a horizontal direction. A feed shaft 41 with a screw part formed on the outer circumference is screwed into this nut part.

A servo motor 19 is connected with an end of the feed shaft 41. The feed shaft 41 is driven to rotate by the servo motor 19.

By the rotation of the feed shaft 41, the saddle 44 moves in the Y-axis direction. By this, the ram 45 is moved and positioned in the Y-axis direction.

Further, the saddle 44 is provided with a not illustrated nut part in the vertical direction. The feed shaft 42 with a screw part formed on the outer circumference is screwed into this nut part. A servo motor 20 is connected with an end of the shaft 42.

The servo motor 20 drives the feed shaft 42 to rotate. By this, the ram 45 movably provided on the saddle 44 is moved and positioned in the Z-axis direction.

The ram 45 has built into it a spindle motor 31. This spindle motor 31 rotates a spindle 46 rotatably supported by the ram 45. At the front end of the spindle 46 are provided a tool T comprised of an end mill or other machining tool and a tool holder for holding this machining tool. The tool T is driven by the rotation of the spindle 46.

Below the ram 45, a table 35 on which a workpiece to be worked is fixed is provided movably in the X-axis direction. The table 35 is provided with a not illustrated nut part. A not illustrated nut feed shaft provided along the X-axis direction is screwed into this nut part. This not illustrated feed shaft is connected to the servo motor 18.

The table 35 is moved and positioned in the X-axis direction by the rotation and driving of the servo motor 18.

Further, the double housing column 38 is provided with a not illustrated nut part. The cross rail 37 is raised and lowered by the rotation of the feed shaft 32a screwed into it by a cross rail elevation motor 32.

An automatic tool changer (ATC) 39 automatically changes the tool T attached to the spindle 46.

That is, the automatic tool changer 39 stores in a not illustrated magazine tools T comprised of end mills, drills, and various other machining tools held by tool holders, returns a tool T attached to the spindle 46 by a not illustrated tool changing arm into the magazine, and attaches a required tool T to the spindle 46 by the tool changing arm.

The NC apparatus 250 drives and controls the above servo motors 18, 19, and 20 and the cross rail elevation motor 32.

The NC apparatus 250 controls the positions and the speeds between a workpiece and the tool T by the servo motors 18, 19, and 20 according to a machining routine defined in advance in a machining program. Further, the NC apparatus 250 controls the rotational speed of the spindle 46 by decoding the rotational speed (rotational speed per unit time) of the spindle 46 defined by an S-code in the machining program.

Still further, the NC apparatus 250 automatically changes various tools by decoding the tool changing operation of the tool T defined by for example an M-code in the NC program.

The PLC 150 is connected to the NC apparatus 250 and the operational panel 200. The PLC 150 performs various kinds of sequence control for example starting and stopping the machining center 1 in accordance with a predetermined sequence program, outputting signals to switch on and off the display part of the operational panel 200, etc.

Further, the PLC 150 is connected to a spindle motor driver 157 to drive and control the spindle motor 31. The PLC 150 outputs control commands to start and stop the spindle motor 31 and control its speed to the spindle motor driver 157.

Figure 2:
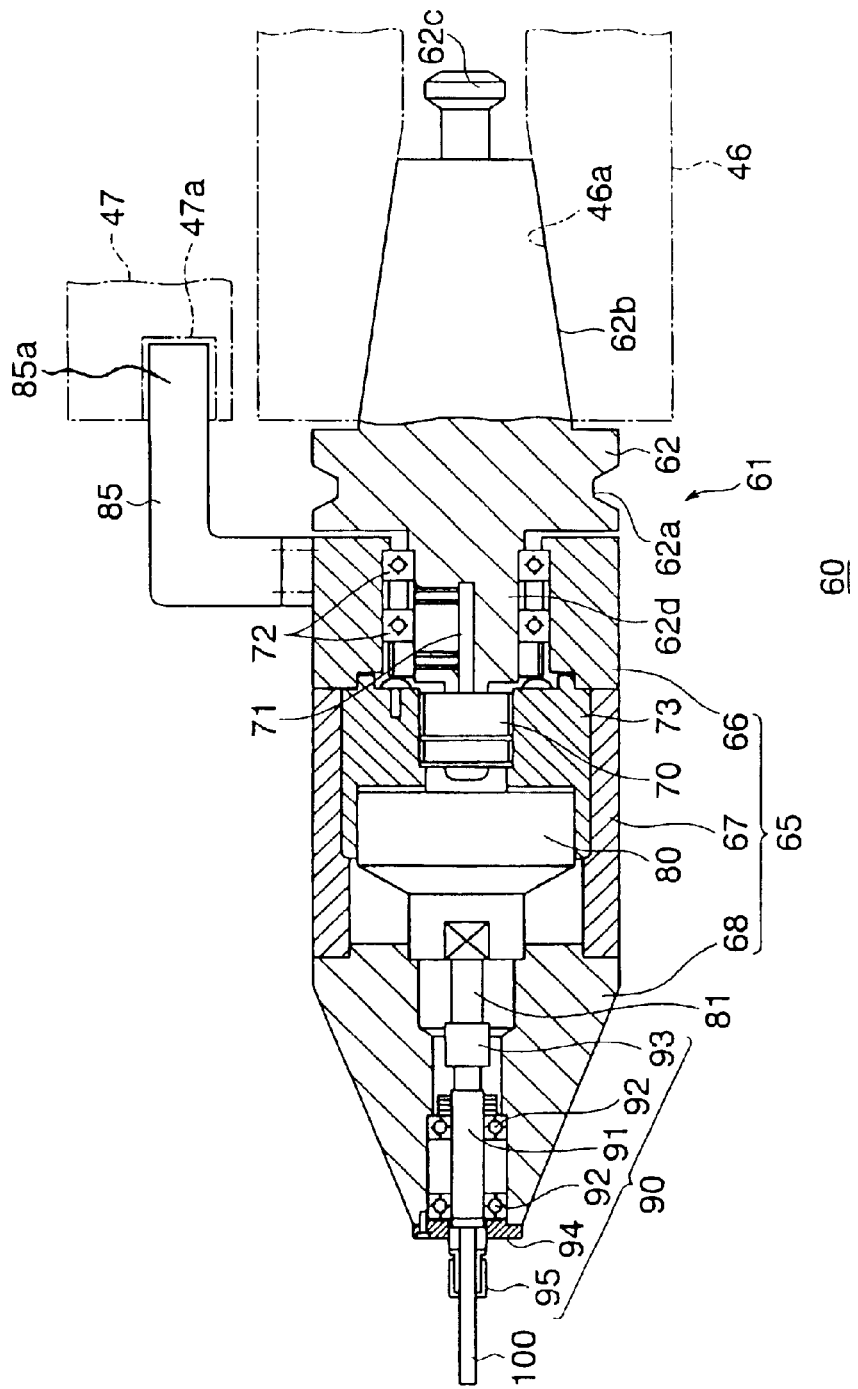
FIG. 2 is a sectional view of the configuration of a tool according to a first embodiment of the present invention.

FIG. 2 is a sectional view of a tool according to the first embodiment of the present invention.

In FIG. 2, a tool 60 is comprised of a cutting tool 100 and a tool holder 61 for holding the cutting tool 100. Note that the cutting tool 100 is an embodiment of a machining tool according to the present invention. Further, the tool 60 according to the present embodiment is attached to the spindle 46 by the automatic tool changer 39 in the same way as the above ordinary tool T.

The tool holder 61 has an attachment part 62, a casing 65 comprised of casing parts 66, 67, and 68, a generator 70, a motor 80, a tool holding part 90, and a locking part 85.

The attachment part 62 is provided with a grip 62a, a taper shank 62b to be attached to a taper sleeve 46a formed at the front end of the above spindle 46, a pull stud 62c formed at the front end of this taper shank 62b, and a shaft 62d rotatably held by the casing part 66.

The grip 62a of the attachment part 62 is gripped by the above tool changing arm of the automatic tool changer 39 when the tool 60 is being attached to the spindle 46 from the magazine of the automatic tool changer 39 and when the tool 60 is being conveyed from the spindle to the magazine of the automatic tool changer 39.

The center of the taper shank 62b of the attachment part 62 becomes concentric with the center of the spindle 46 by being attached to the taper sleeve 46a of the spindle 46.

The pull stud 62c of the attachment part 62 is clamped by a collet of a not illustrated clamping mechanism built in the spindle 46 when the attachment part 62 is attached to the taper sleeve 46a of the spindle 46. Note that the clamping mechanism built in the spindle 46 is well known, so a detailed explanation will be omitted.

The shaft 62d of the attachment part 62 is supported rotatably held by the inner circumference of the casing part 66 via a plurality of bearings 72. As the bearing 72, a sealed ball bearing can be used.

The generator 70 and the motor 80 are held by the inner circumference of the casing part 67 via a holding part 73.

The input shaft 71 of the generator 70 is connected concentrically with the shaft 62d of the attachment part 62. The generator 70 receives the rotary force of the spindle 46 transmitted through the attachment part 62.

Figure 3:
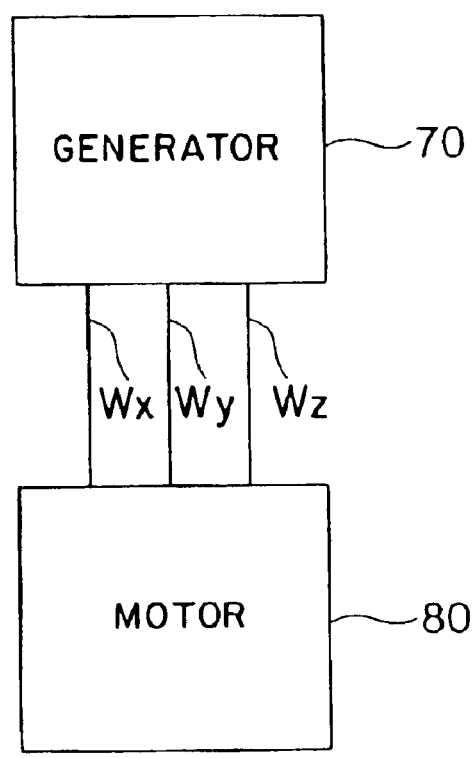
FIG. 3 is a view for explaining the connection state of a motor and generator.

As the generator 70, for example, a three-phase synchronous generator can be used. As shown in FIG. 3, the motor 80 is connected to the generator 70 with three conductor cables CU, CV, and CW. The electric power generated by the generator 70 is supplied through the conductor cables Wx, Wy, and Wz to drive the motor 80.

The tool holding part 90 has a shaft 91, a coupling 93 for connecting this shaft 91 and the output shaft 81 of the motor 80, and a tool attachment part 95 fastened to the front end of the shaft 91.

The shaft 91 is rotatably held by the inner circumference of the casing part 68 via a plurality of bearings 92. As the bearings 92, sealed ball bearings can be used.

The shaft 91 is stopped by a stopper 94 at the casing part 68 at its front end side.

The cutting tool 100 is held by the tool attachment part 95. This cutting tool 100 machines a workpiece. Note that the tool attachment part 95 is an embodiment of the tool holding part according to the present invention. Specifically, as the cutting tool 100, a cutting tool such as a drill or an end mill may be used.

The casing parts 66, 67, and 68 are connected to each other by clamping means such as bolts. The casing 65 is constructed by these casing parts 66, 67, and 68.

The locking part 85 is mounted on the outer circumference of the casing part 66.

When the attachment part 62 is attached to the taper sleeve 46a of the spindle 46, the front end of the locking part 85 is inserted to an engagement hole 47a formed at a non-rotating part such as the ram 45 on the spindle 46 side.

Due to this, even if the spindle 46 is rotated, rotation of the casing part 66, that is, the casing 65, is prevented.

Next, an explanation will be made of an example of the operation of the tool 60 of the present embodiment.

First, the automatic tool changer 39 attaches the tool holder 60 holding the cutting tool 100 at the tool attachment part 95 to the spindle 46 of the machining center 1. The front end 85a of the locking part 85 is inserted into the engagement hole 47a of the non-rotating part 47 whereby the rotation of the casing 65 is prevented.

By rotating the spindle 46 at the rotational speed $N_0$ from this state, the attachment part 62 of the tool 60 is rotated and the rotary force of the spindle 46 is transmitted to the generator 70. By this, the generator 70 generates three-phase alternating current in the case of using a three-phase synchronous generator.

The frequency f of the three-phase alternating current generated by the generator 70 is expressed by the following formula (1) where the number of poles of the generator 70 is $P_1$ and the rotational speed of the spindle 46 is $N_0$ [min$^{-1}$]:

$$f = P_1 \times N_0 / 120 \, [\text{Hz}] \quad (1)$$

Accordingly, when the spindle 46 is rotated at the rotational speed $N_0$, a three-phase alternating current having the frequency f expressed the above formula (1) is supplied to the motor 80.

Here, in case where a three-phase induction motor is used as the motor 80, if the number of poles of the motor 80 is $P_2$, the motor 80 is rotated by $2/P_2$ per cycle of the three-phase alternating current. Therefore, the synchronous rotational speed $N_1$ of the three-phase induction motor at the time of no slippage is expressed by the following formula (2):

$$N_1 = 120 \times f / P_2 \, [\text{min}^{-1}] \quad (2)$$

Accordingly, the relationship of the rotational speed $N_1$ of the tool 60 to the rotational speed $N_0$ of the spindle 46 is expressed by the following formula (3):

$$N_1 = N_0 \times P_1 / P_2 \, [\text{min}^{-1}] \quad (3)$$

As understood from formula (3), the rotational speed $N_0$ of the spindle 46 is changed to the rotational speed $N_1$ expressed by the above formula (3).

As expressed by the formula (3), it is found that by appropriately setting the ratio between the number of poles $P_1$ of the three-phase synchronous generator and the number of poles $P_2$ of the three-phase induction motor, it is possible to freely set the ratio of the rotational speed $N_1$ of the tool 60 to the rotational speed $N_0$ of the spindle 46.

That is, when trying to raise the speed over the rotational speed $N_0$ of the spindle 46, the ratio of the number of poles $P_1/P_0$ is set larger than 1. When trying to lower it, it is sufficient to select the number of poles $P_1$ of the three-phase synchronous generator and the number of poles $P_2$ of the three-phase induction motor so that the ratio $P_1/P_2$ becomes smaller than 1.

For example, when the maximum rotational speed Nmax of the spindle 46 is 3000 min$^{-1}$, if machining a workpiece using an ordinary tool, the maximum rotational speed of the spindle 46 is often sufficient.

On the other hand, when using a machining center 1 having a maximum rotational speed Nmax of the spindle 46 of 3000 min$^{-1}$ and desiring to perform high speed machining using for example an aluminum alloy for the workpiece, sometimes it is desired to increase the rotational speed of the tool 60 to 30,000 min$^{-1}$.

For this purpose, a particular tool 60 is stored in the magazine of the automatic tool changer 39 of the machining center 1 in advance. This tool includes a three-phase synchronous generator and three-phase induction motor having a ratio $P_1/P_2$ of numbers of poles of 10 so as to give a 10-fold increase.

The automatic tool changer 39 automatically attaches the tool 60 to the spindle 46 in the same way as an ordinary tool.

The spindle 46 is rotated by operating the spindle motor 31. The rotational speed of the cutting tool 100 held by the tool 60 is controlled by the rotational speed of the spindle 46. Specifically, in the NC program downloaded at the NC apparatus 250, the rotational speed of the spindle 46 is designated by an S-code so as to define the rotational speed of the cutting tool 100 of the tool 60.

For example, when rotating the cutting tool 100 of the tool 60 at a rotational speed of 30,000 min$^{-1}$, the rotational speed of the spindle 46 is designated as 3000 min$^{-1}$ by the S-code in the NC program.

When the spindle 46 is rotated at the rotational speed of 3000 min$^{-1}$, the generator 70 generates a three-phase alternating current having a frequency in accordance with the rotational speed of the spindle 46 and the number of poles $P_1$.

The motor 80 is driven by the three-phase alternating current supplied from the generator 70, while the cutting tool 100 of the tool 60 is rotated at the rotational speed of about 30,000 min$^{-1}$.

In the above state where the rotational speed of the cutting tool 100 is increased, the workpiece is cut by moving the workpiece fixed on the table 35 relative to the cutting tool 100 (spindle 46) in accordance with the machining program.

Due to this, for example when using a machining center 1 where the maximum rotational speed of the spindle 46 is limited, high speed machining of the workpiece becomes possible by rotating the cutting tool 100 at a rotational speed over the maximum rotational speed of the spindle 46.

In this way, according to the present embodiment, the rotational speed of the tool 60 is raised over that of the spindle 46 by incorporating the generator 70 and motor 80 in the tool holder 61 formed as a unit in the same way as an ordinary tool and driving the motor 80 by the electric power generated by the generator 70. Due to this, even if rotating the spindle 46 at a high speed, heat generated is not increased like with a gear apparatus, heat expansion of the tool 60 is suppressed, and reduction of the machining tolerance is suppressed.

Further, according to the present embodiment, it is possible to make the inertia of the motor 80 smaller than the inertia of the spindle 46. Therefore, it becomes possible to improve the response of the cutting tool 100 compared with when directly rotating the spindle 46 at a high rotational speed.

Further, according to the present embodiment, a tool 60 increased in rotational speed compared with the spindle 46 can be attached to the spindle 46 and be changed by the automatic tool changer 39 in the same way as an ordinary tool. Therefore, it is possible to immediately respond to a request for machining at a higher speed while machining within an ordinary rotational speed.

Further, according to the present embodiment, the cutting tool 100 is driven by the electric power generated by the rotation of the spindle 46. Therefore, it is not necessary to supply a driving current from the outside. As a result, a cable for supplying electric power is not needed.

Second Embodiment

The cutting tool 100 of the tool 60 according to the above mentioned embodiment is arranged in the axial center direction of the spindle 46, that is, the shaft of the motor 80 is arranged in the axial center direction of the spindle 46.

On the other hand, various types of composite machining are required in the machining center 1. With just a tool 60 with the cutting tool 100 oriented in the axial center direction of the spindle 46, composite machining cannot be handled.

In the present embodiment, an explanation will be made of a tool able to handle composite machining of a machining center 1.

Figure 4:
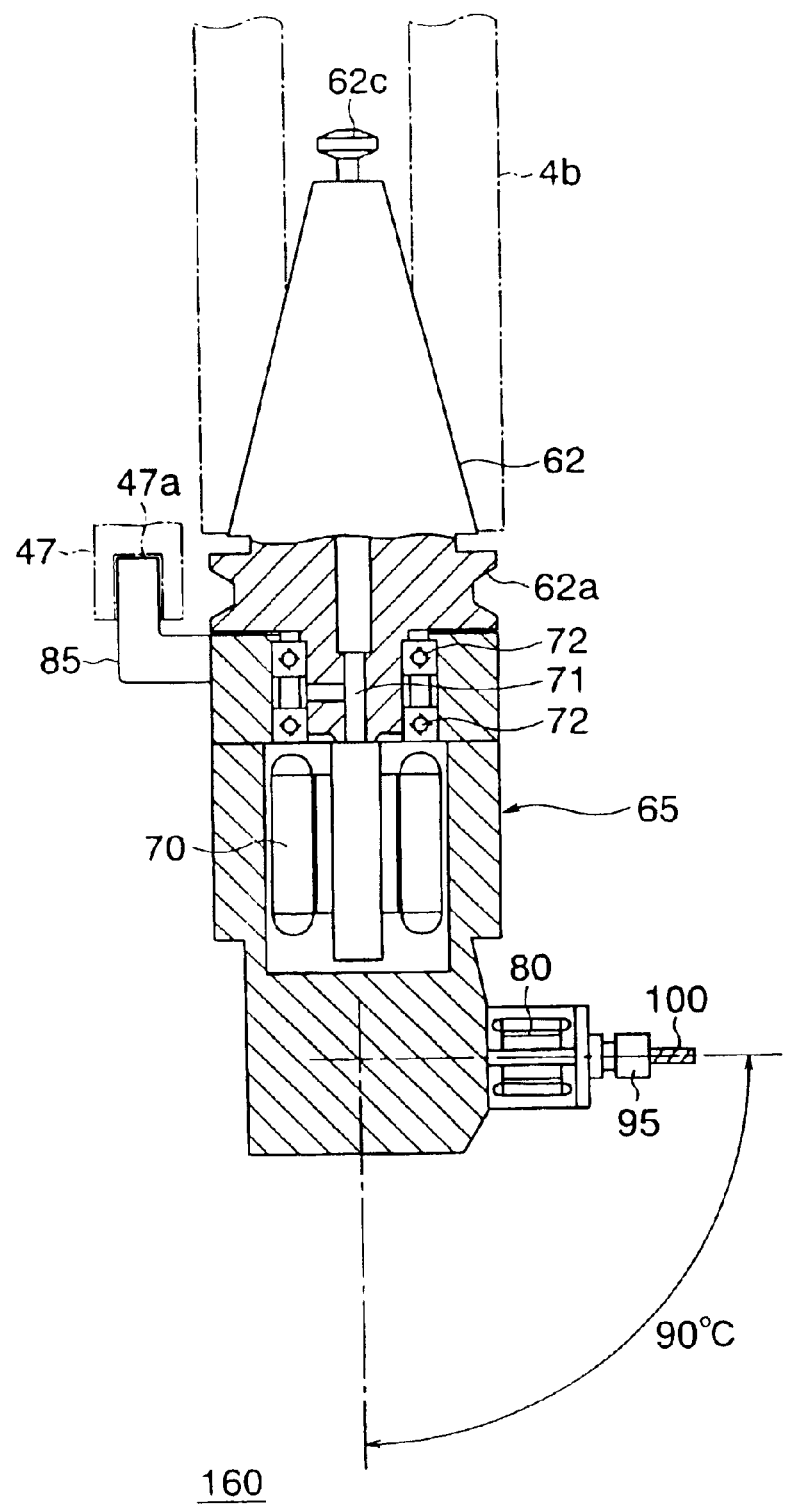
FIG. 4 is a sectional view of the configuration of a tool according to a second embodiment of the present invention.
Figure 5:
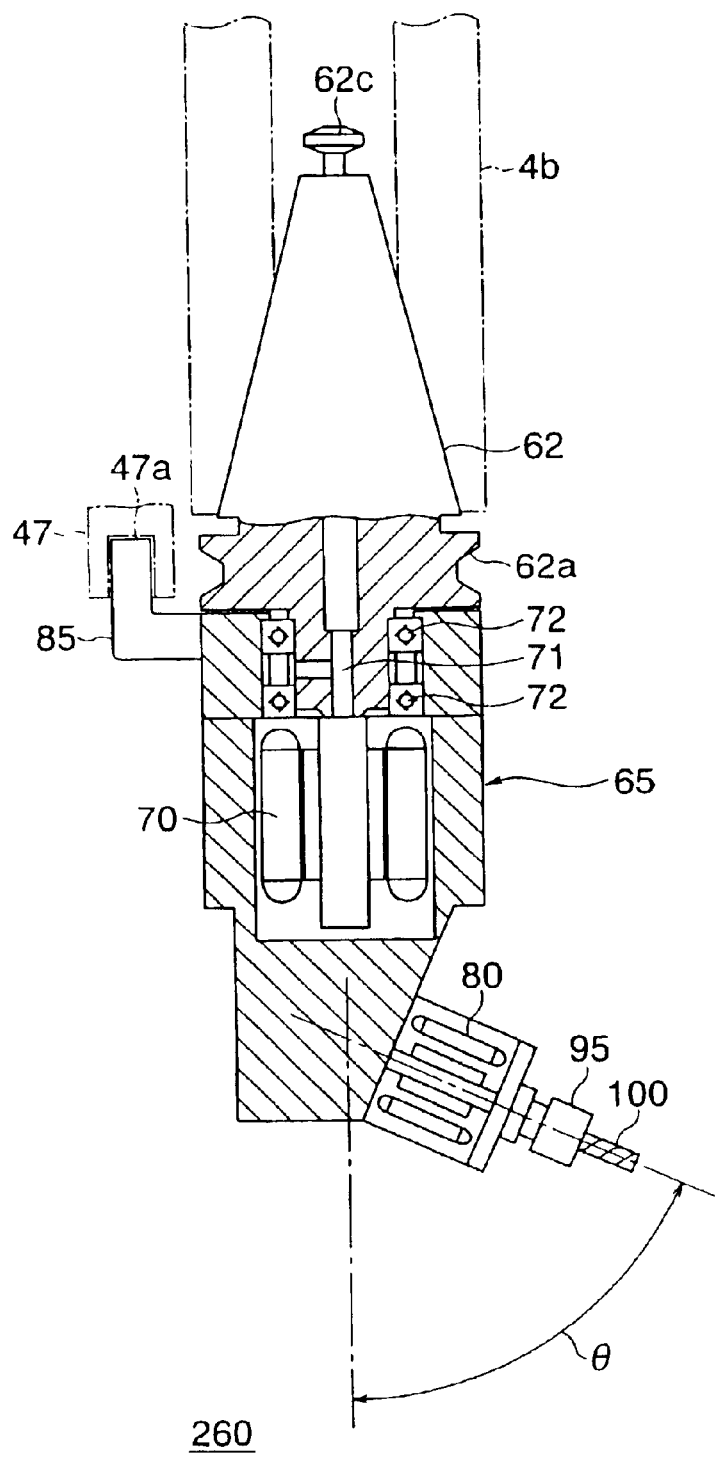
FIG. 5 is a sectional view of the configuration of a tool according to a second embodiment of the present invention.
Figure 6:
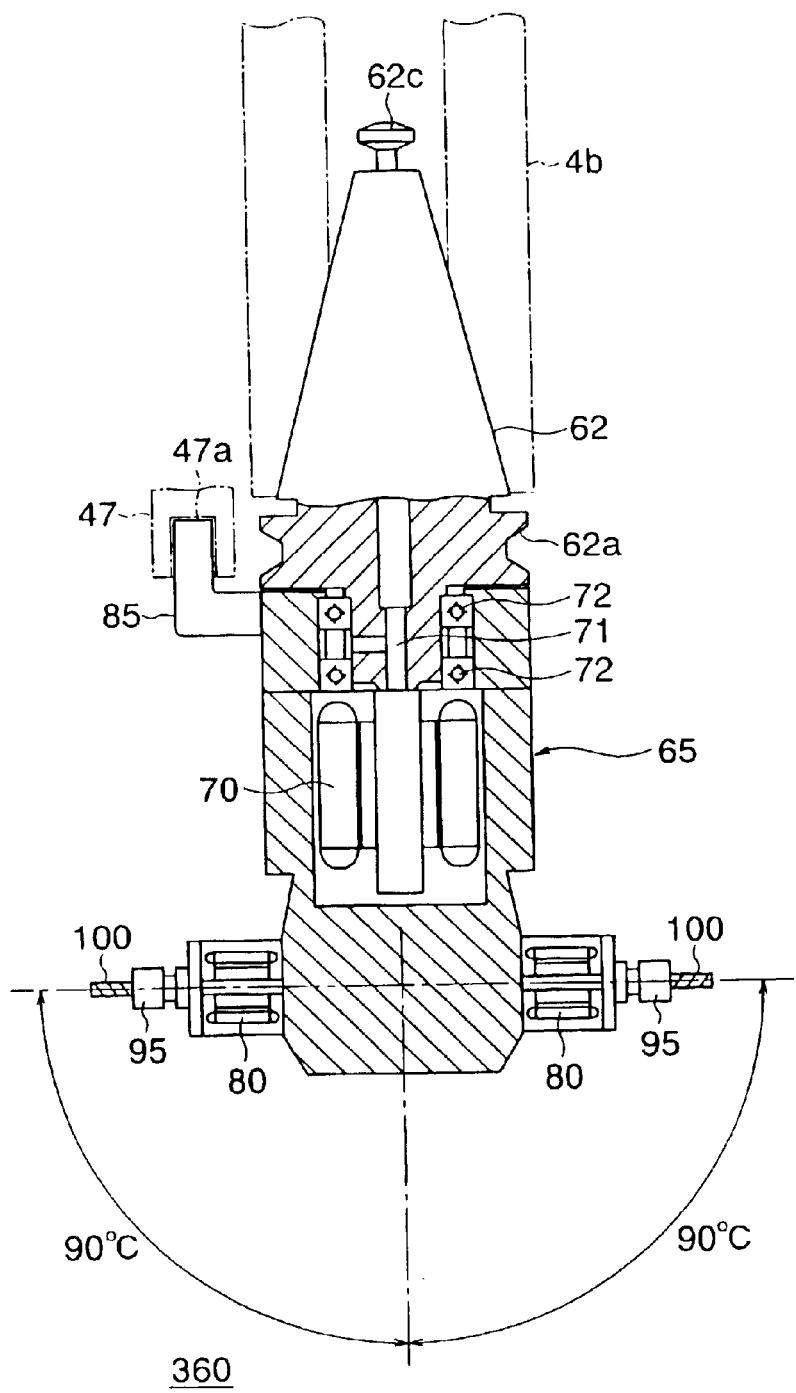
FIG. 6 is a sectional view of the configuration of a tool according to a second embodiment of the present invention.

FIG. 4 to FIG. 6 are schematic views of the configuration of tools according to another embodiment of the present invention. Note that FIG. 4 and FIG. 6 use the same reference numerals for parts the same as in the above first embodiment. Further, the tools shown in FIG. 4 to FIG. 6 are basically the same in operation as the tool 60 according to the above first embodiment.

The tool 160 shown in FIG. 4 is, like the tool 60 according to the first embodiment, provided with an attachment part 62, case 65, generator 70, motor 80, tool attachment part 95, locking part 85, and cutting tool 100.

The motor 80 of the tool 160 is fastened to the case 65 so that the cutting tool 100 connected to the shaft of the motor 80 is oriented perpendicularly to the axial center of the spindle 46.

By using the tool 160, it is for example possible to efficiently machine the side surfaces of a workpiece.

The tool 260 shown in FIG. 5 is, like the tool 60 according to the first embodiment, provided with an attachment part 62, case 65, generator 70, motor 80, tool attachment part 95, locking part 85, and cutting tool 100.

In the tool 260, the cutting tool 100 connected to the shaft of the motor 80 is oriented inclined at an angle θ with respect to the axial center of the spindle 46.

The angle θ is set to an angle such as 30°, 45°, and 60°.

The tool 260 is for example used for machining the slanted surface of the workpiece.

The tool 360 shown in FIG. 6 is, like the tool 60 according to the first embodiment, provided with an attachment part 62, case 65, generator 70, and locking part 85 and is provided with a plurality of (two) motors 80 and tool attachment parts 95 and cutting tools 100 connected to the shafts of these motors 80.

The two motors 80 of the tool 360 are fastened to the case 65 so that the cutting tools 100 connected to the shafts of the motors 80 are oriented perpendicularly to the axial center of the spindle and the cutting tools 100 are positioned on the same line.

The generator 70 and the two motors 80 are connected so that the electric power generated by the generator 70 is distributed to the two motors 80.

The various tools 160, 260, and 360, in addition to an ordinary tool (not including a generator and motor) and a tool 60 according to the first embodiment, are stored in a not shown magazine of the automatic tool changer 39 of the machining center 1.

The required tool in the tools stored in the magazine is selected and automatically attached to the spindle 46 by the automatic tool changer 39 so as to enable the workpiece to be machined by the tools 160, 260, and 360.

When the postures of the cutting tools 100 are different from the axial center of the spindle 46 as with the tools 160, 260, and 360 of the present embodiment, a transmission mechanism comprised of bevel gears etc. for transmitting rotation of the spindle 46 to the cutting tool 100 was for example required in the past. According to the present embodiment, however, due to the provision of the generator 70 and the motors 80, a transmission mechanism is not required.

That is, the tools 160, 260, and 360 according to the present embodiment do not directly mechanically transmit the rotary force of the spindle 46 to the cutting tools 100. Instead, they convert the rotary force of the spindle 46 to electrical energy, then the electrical energy is used to generate rotary force and rotate the cutting tools 100, so the tools are resistant to the mechanical error, vibration, heat displacement, etc. unavoidable in a transmission mechanism comprised of bevel gears etc.

In the tools 160, 260, and 360 according to the present embodiment, the motors 80 are fastened to the case 65, so the rigidity during machining can be secured.

As a result, according to the present embodiment, it becomes possible to improve the machining tolerance of the workpiece.

Further, according to the present embodiment, it is possible to provide various types of tools in the automatic tool changer 39 of the machining center 1 and attach them to the spindle 46 in accordance with need, so it is possible to greatly improve the machining performance of the machining center 1.

Note that in the present embodiment, the explanation was made of three types of tools having built-in generators and motors referring to FIG. 4 to FIG. 6, but various modifications are possible other than these.

Third Embodiment

Figure 7:
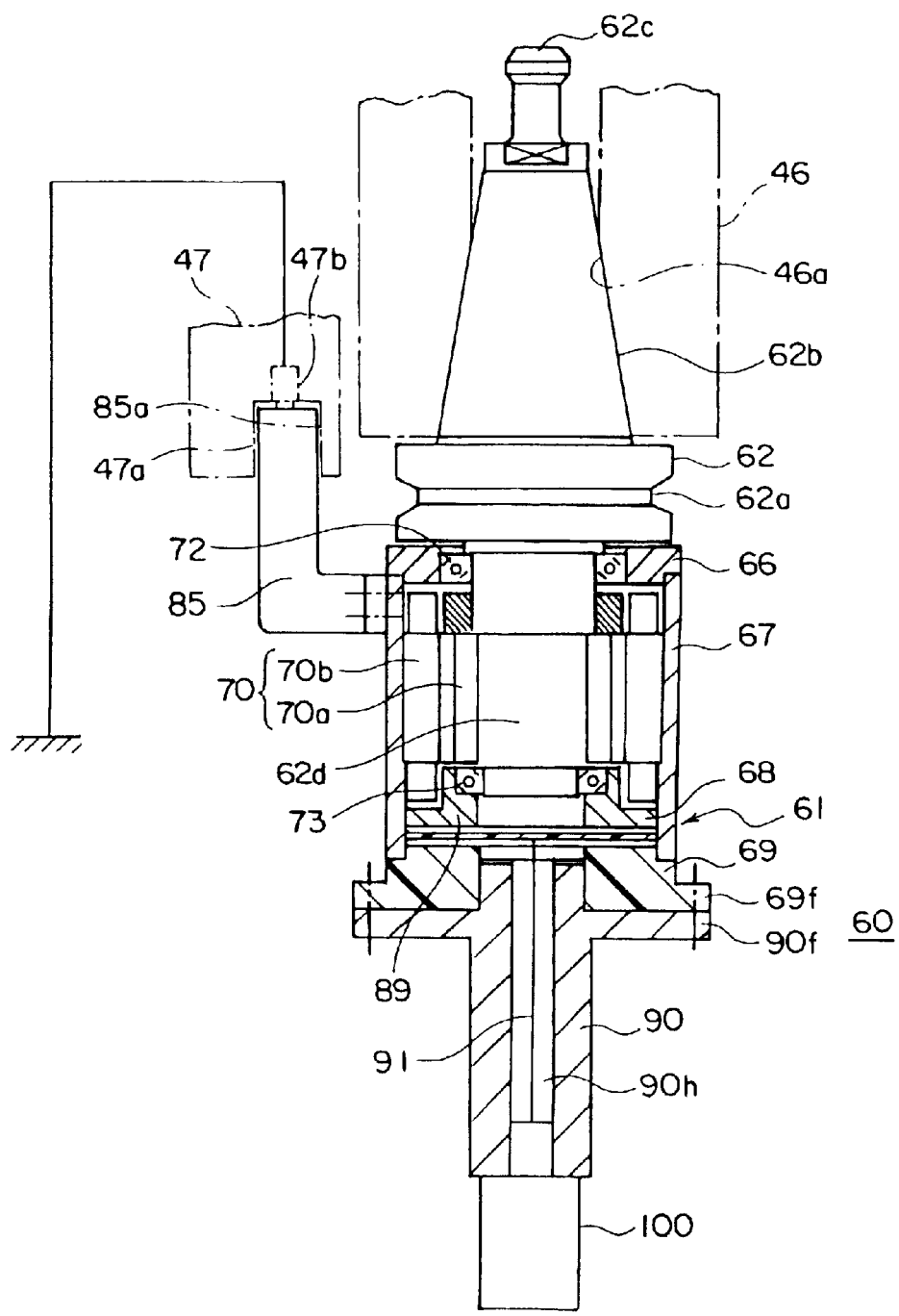
FIG. 7 is a sectional view of the configuration of an electrodischarge machining tool according to a third embodiment of the present invention.

FIG. 7 is a sectional view of the configuration of an electrodischarge machining tool according to a third embodiment of the present invention.

In FIG. 7, the electrodischarge machining tool 60 is comprised of an electrode 10 and a holder 61 holding this electrode 100. Note that the electrodischarge machining tool 60 according to the present embodiment may be attached to a spindle 46 by an automatic tool changer 39 in the same way as the above ordinary tool T.

The holder 61 is provided with an attachment part 62, bearing holding part 66, casing 67, bearing holding part 68, locking part 85, insulating part 69, electrode holding part 90, circuit board 89, and generator 70.

The attachment part 62 is provided with a grip 62a, a taper shank 62b to be attached to a taper sleeve 46a formed at the front end of the above spindle 46, a pull stud 62c formed at the front end of this taper shank 62b, and a shaft 62d rotatably held by the bearing holding parts 66 and 68 through the bearings 72 and 73.

The grip 62a of the attachment part 62 is gripped by the above tool changing arm of the automatic tool changer 39 when the tool 60 is being attached to the spindle 46 from the magazine of the automatic tool changer 39 and when the tool 60 is being conveyed from the spindle 46 to the magazine of the automatic tool changer 39.

The center of the taper shank 62b of the attachment part 62 becomes concentric with the center of the spindle 46 by being attached to the taper sleeve 46a of the spindle 46.

The pull stud 62c of the attachment part 62 is clamped by a collet of a not illustrated clamping mechanism built in the spindle 46 when the attachment part 62 is attached to the taper sleeve 46a of the spindle 46. Note that the clamping mechanism built in the spindle 46 is well known, so a detailed explanation will be omitted.

A rotor 70a of the generator 70 is fastened to the shaft 62d of the attachment part 62.

The casing 67 is comprised of a cylindrical part formed of stainless steel or another metal material. A stator 70b of the generator 70 is fastened to a position facing the rotor 70a at the inner circumference of the casing 67.

The generator 70 generates electric power by the rotation of the rotor 70a fastened to the shaft 62d of the attachment part 62. For the generator 70, for example, a three-phase synchronous generator is used.

The bearing holding parts 66 and 78 are comprised of ring-shaped parts and hold the bearings 72 and 73 at their inner circumferences. These bearing holding parts 66 and 68 fit at the inner circumference of the casing 67 and are fastened to the casing 67 by bolts or other fastening means.

The circuit board 89 is arranged in the space at the bottom side of the bearing holding part 68. This circuit board 89 is formed with a later explained rectifier circuit, current control circuit, and various other electric circuits. It is connected to the three-phase winding of a stator 70b of the generator 70 and is connected to the electrode 100 by a conductor 91. Further, the circuit board 89 has the casing 67 as a reference potential.

The insulating part 69 is comprised of a ring-shaped part formed by for example a ceramic. The insulating part 69 is fit at the lower end of the casing 67 and fastened to the casing 67. The insulating part 69 electrically insulates between the electrode holding part 90 and casing 67.

The top end of the electrode holding part 90 fits at the inner circumference of the insulating part 69. The flange 90f is fastened by bolts or other fastening means to the flange 69f of the insulating part 69. The electrode holding part 90 is provided with a through hole 90h at its center. The conductor 91 is connected to the electrode 100 through the through hole 90h.

The electrode holding part 90 is formed from stainless steel or another metal material. The electrode 100 is held exchangeably at its front end.

The locking part 85 is fastened by bolts or other fastening means to the outer circumference of the casing 67. The locking part 85 is formed by stainless steel or another metal material.

The front end 85a of the locking part 85 is inserted into an engagement hole 47a formed in for example a ram 45 or other non-rotating part 47 of the spindle 46 side by the taper shank 62b of the attachment part 62 being attached to the taper sleeve 46a of the spindle 46.

Due to this, the casing 67 is limited in rotation even if the spindle 46 rotates.

A contact terminal 47b is provided in the engagement hole 47a formed in the non-rotating part 47. This contact terminal 47b is grounded. Therefore, if the front end 85a of the locking part 85 is inserted into the engagement hole 47a, the contact terminal 47a and the front end 85a of the locking part 85 come into contact. Due to this, the casing 67 is grounded.

The electrode 100 is held by the electrode holding part 90. This electrode 100 is used for electrodischarge machining of the workpiece. The material forming the electrode 100 is for example copper-tungsten alloy, silver-tungsten alloy, copper-graphite, aluminum, iron, brass, or another material.

Further, the electrode 100 is cut in advance to a predetermined shape.

At the time of electrodischarge machining, the electrode 100 is supplied with for example a voltage of tens of volts and a current of several amperes or so.

Figure 8:
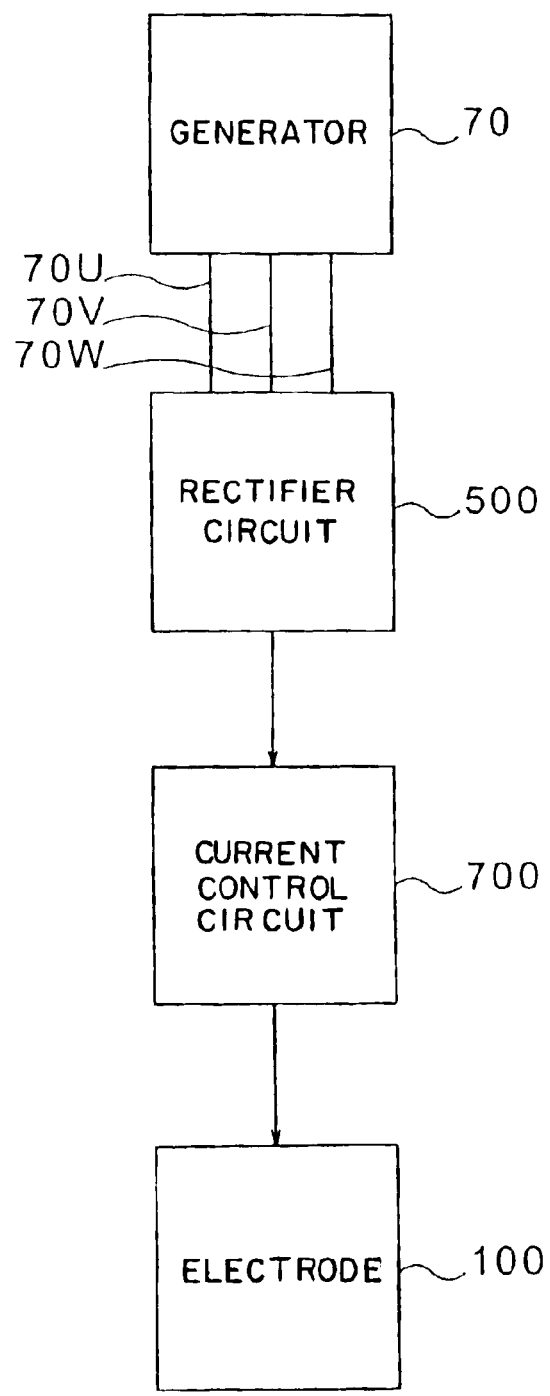
FIG. 8 is a functional block diagram of an electrical system of an electrodischarge machining tool.

FIG. 8 is a functional block diagram of an electrical system of an electrodischarge machining tool 60.

As shown in FIG. 8, the electrodischarge machining tool 60 is provided with a rectifier circuit 500 and current control circuit 700 in addition to the generator 70 and electrode 100.

The rectifier circuit 500 and current control circuit 700 are formed at the above circuit board 89.

The rectifier circuit 500 is supplied with three-phase alternating current generated by the generator 70 through conductor cables 70U, 70V, and 70W. The rectifier circuit 500 converts the three-phase alternating current to direct current of a predetermined voltage and supplies it to the current control circuit 700.

The current control circuit 700 converts the electric power rectified at the rectifier circuit 500 to DC power of a predetermined voltage required for electrodischarge machining and supplies it to the electrode 100. This current control circuit 700 controls the current supplied to the electrode 100 from a transistor and for example supplies voltage in a pulse to the electrode 100.

Next, an example of electrodischarge machining using an electrodischarge machining tool 60 of the above configuration will be explained.

First, the automatic tool changer 39 attaches the electrodischarge machining tool 60 holding the electrode 100 to the spindle 46 of the machine tool body 2.

The electrodischarge machining tool 60 is limited in rotation of the casing 67 by the insertion of the front end 85a of the locking part 85 in the engagement hole 47a of a non-rotating part 47.

On the other hand, as shown in FIG. 9, the workpiece W to be subjected to electrodischarge machining at the inside and a machining solution tank 600 containing a machining solution 601 are placed on a table 35 arranged below the electrodischarge machining tool 60.

The machining solution 601 has an electrical insulating property and for example uses an insulating oil.

The workpiece W is formed by a metal material. It is housed in the machining solution tank 600 and is immersed in its entirety in the machining solution 601. The workpiece W is grounded.

The spindle 46 is rotated at a predetermined rotational speed from the state shown in FIG. 9.

If the spindle 46 is rotated, the attachment part 62 of the electrodischarge machining tool 60 rotates, and the rotor 70a of the generator 70 rotates with respect to the stator 70b.

Due to this, the generator 70 generates three-phase alternating current power when using for example a three-phase synchronous generator.

The electric power generated by the generator 70 is rectified at the rectifier circuit 500 and supplied to the current control circuit 700. The current control circuit 700 supplies DC power of a predetermined voltage to the electrode 100.

In the state with DC power of a predetermined voltage supplied to the electrode 100, the electrodischarge machining tool 60 is made to descend toward the workpiece W in the direction of the arrow Z1 shown in FIG. 9.

When the electrodischarge machining tool 60 is lowered and the electrode 100 approaches the workpiece W, insulation breakdown of the machining solution 601 occurs and a discharge is generated at the portion of the smallest dielectric strength between the electrode 100 and workpiece W. The discharge generated immediately becomes an arc discharge and stabilizes. A locally extremely large energy flows from the part of the arc between the electrode 100 and workpiece W, so the electrode 100 and the workpiece W near the part of the arc are rapidly heated and either vaporize or melt. Due to this, that part of the workpiece W is removed.

Figure 10:
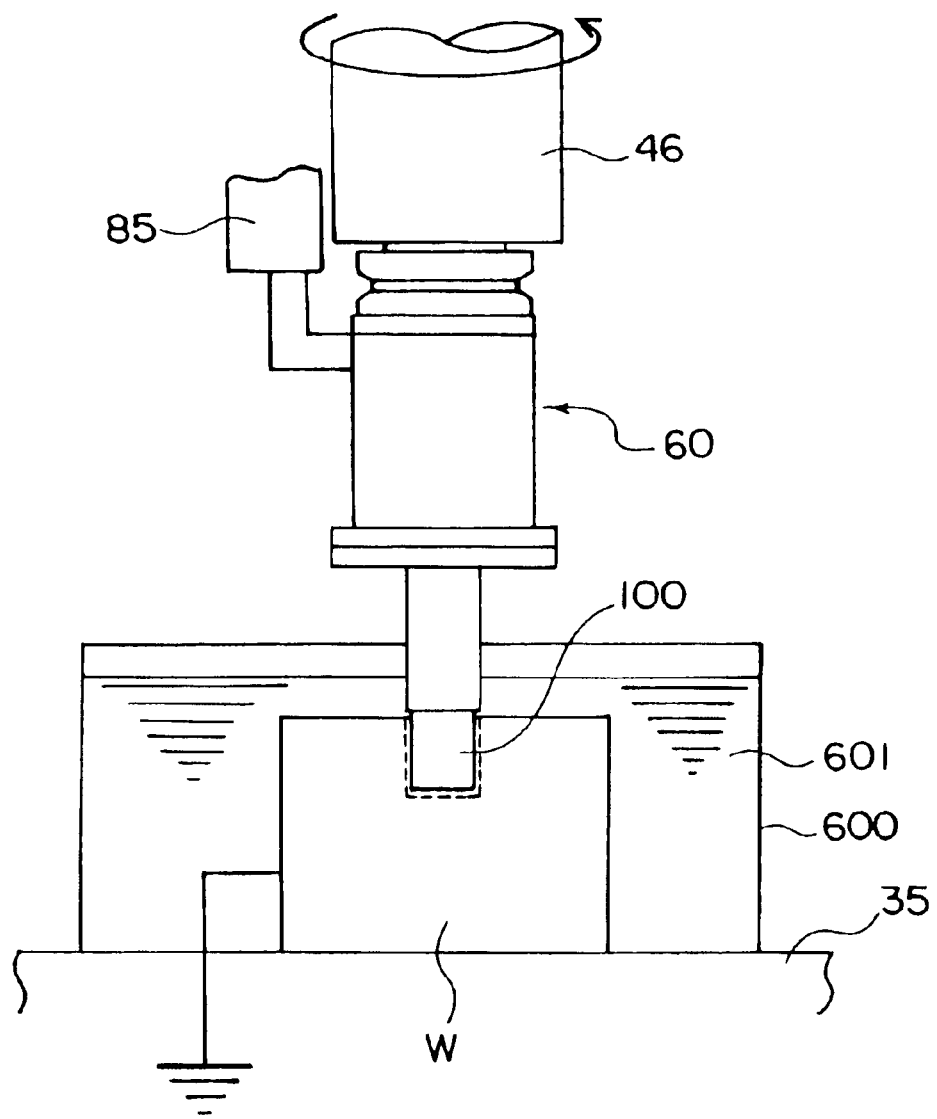
FIG. 10 is a view for explaining the routine of electrodischarge machining using an electrodischarge machining tool following FIG. 9.

As shown in FIG. 10, when the electrodischarge machining tool 60 is made to descend, the shape of the electrode 100 is transferred to the workpiece W.

Further, the workpiece W is machined to a desired shape by moving the workpiece W and electrode 100 three-dimensionally in accordance with an NC program downloaded to the NC apparatus 250.

As explained above, according to the present embodiment, by building a generator 70 in the electrodischarge machining tool 60, using the rotary force of the spindle 46 of the machine tool body 2 to generate electric power at the generator 70, and supplying the electric power generated to the electrode 100 for electrodischarge machining, supply of electric power to the electrode 100 from an outside power source is no longer required.

Further, according to the present embodiment, it becomes possible to simply machine the workpiece W by electrodischarge machining by attaching the electrodischarge machining tool 60 to the spindle 46 of a machine tool body 2 designed for cutting a workpiece by attaching various types of tools to the spindle 46 of the machine tool body 2.

That is, according to the present embodiment, by just attaching the electrodischarge machining tool 60 to the machine tool body 2 designed for cutting, it becomes possible to use the machine tool body 2 as an electrodischarge machining apparatus.

The present invention is not limited to the above embodiment.

In the above-mentioned embodiment, the explanation was made of the case of using a spindle motor 31 built into the machine tool body 2 powered by a generator 70 built in the electrodischarge machining tool 60. For example, it becomes possible to form a passage for carrying compressed air in the spindle 46, supply compressed air through this passage to the generator 70, and cause the generator 70 to generate electric power by the compressed air.

In the above embodiment, the explanation was made of the case of attaching an electrodischarge machining tool 60 to the spindle 46, but the present invention is not limited to a spindle 46 so long as the location is one where the generator can receive power.

Fourth Embodiment

Figure 11:
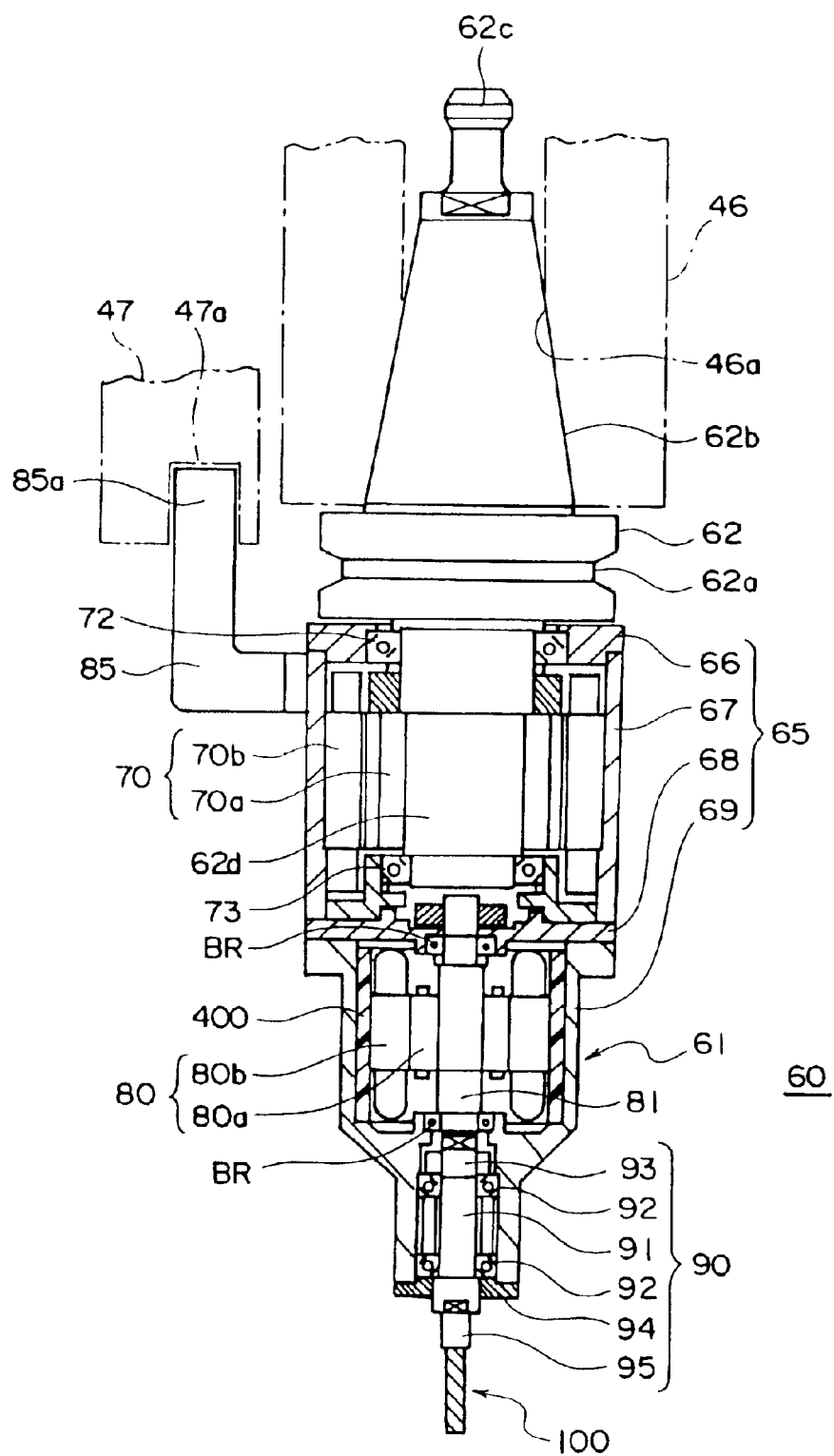
FIG. 11 is a sectional view of the configuration of a tool according to a fourth embodiment of the present invention.

FIG. 11 is a sectional view of the configuration of an embodiment of a tool of the present invention.

In FIG. 11, the tool 60 is comprised with a cutting tool 100 and a tool holder 61 holding that cutting tool 100. Note that the cutting tool 100 is one embodiment of a machining tool of the present invention. Further, the tool 60 according to the present embodiment is able to be attached to the spindle 46 by an automatic tool changer 39 in the same way as an ordinary tool T.

The tool holder 61 is provided with an attachment part 62, a casing 65 comprised of casing parts 66, 67, 68, and 69, a generator 70, a motor 80, a tool holder 90, and a locking part 85.

The casing parts 66, 67, 68, and 69 are connected with each other by bolts or other fastening means. These casing parts 66, 67, 68, and 69 form the casing 65. The casing parts 66, 67, 68, and 69 are formed by stainless steel or another metal material.

The attachment part 62 is provided with a grip 62a, a taper shank 62b to be attached to a taper sleeve 46a formed at the front end of the above spindle 46, a pull stud 62c formed at the front end of this taper shank 62b, and a shaft 62d rotatably held in the casing 65 through the plurality of bearings 72 and 73.

The grip 62a of the attachment part 62 is gripped by the above tool changing arm of the automatic tool changer 39 when the tool 60 is being attached to the spindle 46 from the magazine of the automatic tool changer 39 and when the tool 60 is being conveyed from the spindle to the magazine of the automatic tool changer 39.

The center of the taper shank 62b of the attachment part 62 becomes concentric with the center of the spindle 46 by being attached to the taper sleeve 46a of the spindle 46.

The pull stud 62c of the attachment part 62 is clamped by a collet of a not illustrated clamping mechanism built in the spindle 46 when the attachment part 62 is attached to the taper sleeve 46a of the spindle 46. Note that the clamping mechanism built in the spindle 46 is well known, so a detailed explanation will be omitted.

A rotor 70a of a later mentioned generator 70 is fastened to the shaft 62d of the attachment part 62.

A stator 70b of the generator 70 is fastened to a position facing the rotor 70a at the inner circumference of the casing 67.

The generator 70 generates electric power by the rotation of the rotor 70a fastened to the shaft 62d of the attachment part 62. For the generator 70, for example, a three-phase synchronous generator is used.

A Peltier element 400 is fastened to the inner circumference of the casing part 69. This Peltier element 400 is formed in a cylindrical shape. The outer circumferential surface contacts the inner circumferential surface of the casing part 69. Note that the configuration of the Peltier element 400 will be explained later.

The stator 80b of the motor 80 is fastened to the inner circumference of the Peltier element 400.

On the other hand, the shaft 81 of the motor 80 is rotatably held at the inner circumference of the casing part 68 and the casing part 69 through a plurality of bearings BR. The rotor 80a is fastened facing the stator 80b at the shaft 81 of the motor 80. By supplying current to the winding of the stator 80b of the motor 80, the shaft 81 rotates.

As the motor 80, for example, a three-phase induction motor may be used.

The tool holder 90 is provided with a shaft 91, a coupling 93 connecting the shaft 91 and a shaft 81 of the motor 80, and a tool attachment part 95 fastened to the front end of the shaft 91.

The shaft 91 is rotatably held at the inner circumference of the casing part 69 through a plurality of bearings 92.

The front end of the shaft 91 is locked at the casing part 69 by the locking part 94.

The cutting tool 100 is held by the tool attachment part 95. This cutting tool 100 machines the workpiece. Note that the tool attachment part 95 is one embodiment of the tool holder of the present invention. The cutting tool 100 specifically includes various types of tools such as drills and end mills.

A locking part 85 is provided at the outer circumference of the casing part 67.

The front end 85a of the locking part 85 is inserted into the engagement hole 47a formed in for example the ram 45 or another non-rotating part 47 of the spindle 46 side by the insertion of the attachment part 62 in the taper sleeve 46a of the spindle 46.

Due to this, the casing part 67, that is, the casing 65, is limited in rotation even if the spindle 46 rotates.

Figure 12:
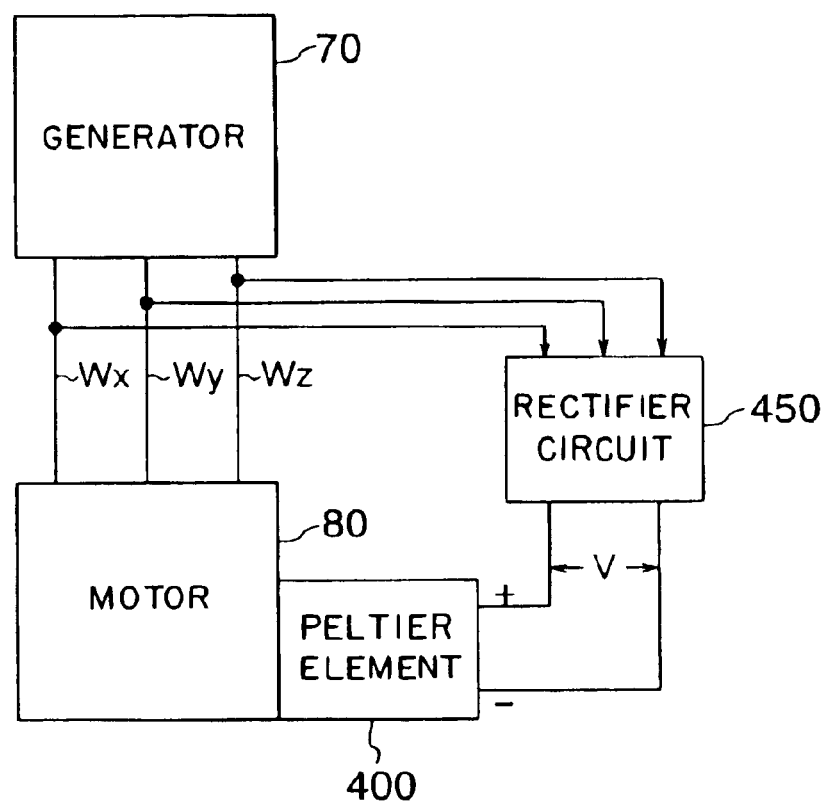
FIG. 12 is a functional block diagram of an electrical system of a tool according to the fourth embodiment of the present invention.

FIG. 12 is a functional block diagram of the electrical system of a tool 60 of the above configuration.

As shown in FIG. 12, the tool 60 is provided with a rectifier circuit 450 in addition to the generator 70, motor 80, and Peltier element 400. The rectifier circuit 450 is for example arranged at a predetermined location in the casing 65.

The generator 70 is electrically connected to the motor 80 by a plurality of conductor cables Wx, Wy, and Wz. The three-phase current generated by the generator 70 is supplied to the motor 80 through these conductor cables Wx, Wy, and Wz.

The rectifier circuit 450 is supplied with part of the three-phase alternating current generated by the generator 70. The rectifier circuit 450 converts this three-phase alternating current to a predetermined voltage V and supplies it to the Peltier element. The voltage V is for example several volts to several tens of volts.

Figure 13:
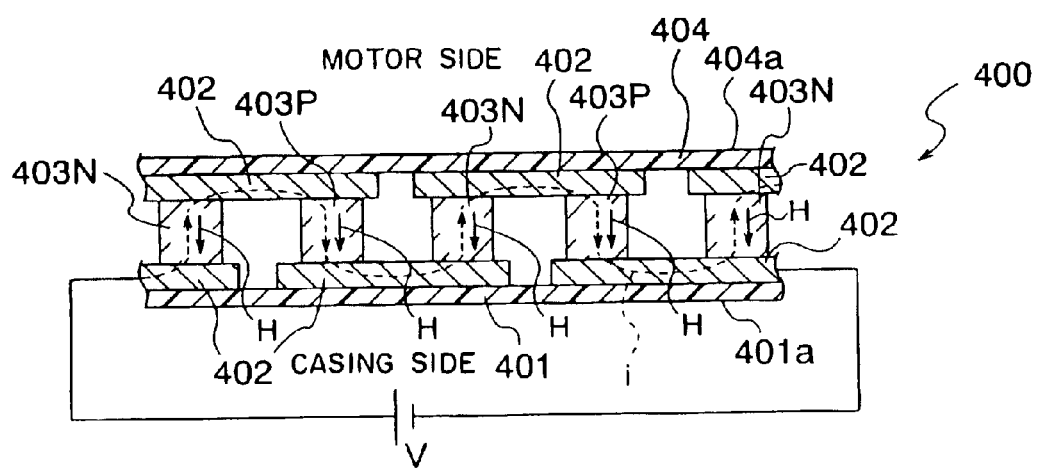
FIG. 13 is a sectional view of the schematic structure of a Peltier element.

FIG. 13 is a sectional view of the schematic structure of the above Peltier element.

The Peltier element 400 shown in FIG. 13 is provided with an insulator 401, connection use metal parts 402, N-type heat transfer elements 403N, P-type heat transfer elements 403P, and an insulator 404.

The insulator 401 is for example formed by a ceramic. The outer surface 401a of the insulator 401 contacts the inner circumference of the casing 65 (casing part 69).

The N-type heat transfer elements 403N and P-type heat transfer elements 403P are alternately arranged on the insulator 401 through the connection use metal parts 402.

The heat transfer elements 403N and the heat transfer elements 403P are formed by semiconductor materials. Heat is moved in a predetermined direction by the flow of current. When current flows in the same direction between the heat transfer element 403N and the heat transfer element 403P, the directions of movement of heat become opposite.

The insulator 404 is provided on the N-type heat transfer elements 403N and P-type heat transfer elements 403P through the connection use metal parts 402. The insulator 404 is formed for example of a ceramic. The outer surface 404a of the insulator 404 contacts the outer circumference of the stator 80b of the motor 80.

The connection use metal parts 402 electrically serially connect the alternately arranged N-type heat transfer elements 403N and P-type heat transfer elements 403P.

When a predetermined voltage V output from the rectifier circuit 450 in the Peltier element 400 of the above configuration is applied from the heat transfer element 403N positioned at one end to the heat transfer element 403P positioned at the other end, a DC current i flows by the route shown by the broken line in FIG. 13.

By the flow of the current i, the heat transfer elements 403N and heat transfer elements 403P move the heat in the direction of the arrow H, that is, from the insulator 404 at the motor 80 side to the insulator 401 at the casing 65 side.

Due to this, the heat generated due to operation of the motor 80 can be discharged to the outside through the casing 65.

Part of the three-phase alternating current generated by the generator 70 is supplied to the rectifier circuit 450. This is converted to direct current of a predetermined voltage V in the rectifier circuit 450, then is supplied to the Peltier element 400.

The Peltier element 400 moves the heat generated by the operation of the motor 80 toward the casing part 69.

The casing part 69 is formed by a metal material, so has a relatively high heat conductivity. The heat moved from the motor 80 side by the Peltier element 400 is discharged to the outside of the tool 60 through the casing part 69.

Due to this, the large amount of heat generated by the operation of the motor 80, in particular high speed operation, can be efficiently discharged to the outside of the tool 60. Therefore, overheating of the motor 80 and a rise in temperature of the tool as a whole can be suppressed.

In this way, according to the present embodiment, by building a generator 70 and motor 80 into the tool 60 formed as a unit in the same way as an ordinary tool and driving the motor 80 by the electric power generated by the generator 70 so as to increase the rotational speed of a tool over that of the spindle 46, even if rotating the spindle 46 at a high speed, heat generated is not increased like with a gear apparatus, and deterioration of the machining tolerance is suppressed.

In the above embodiment, a Peltier element 400 is provided at the inner circumference of the casing part 69 and heat is discharged to the outside through the casing part 69. To further efficiently discharge heat to the outside of the tool 60, it is also possible to provide a heat sink at the outer circumference of the casing part 69. Further, it is also possible to make the casing part 69 itself a heat sink.

Further, it is also possible to provide a cooling jacket at the outer circumference of the casing part 69 in addition to a heat sink.

Fifth Embodiment

Figure 14:
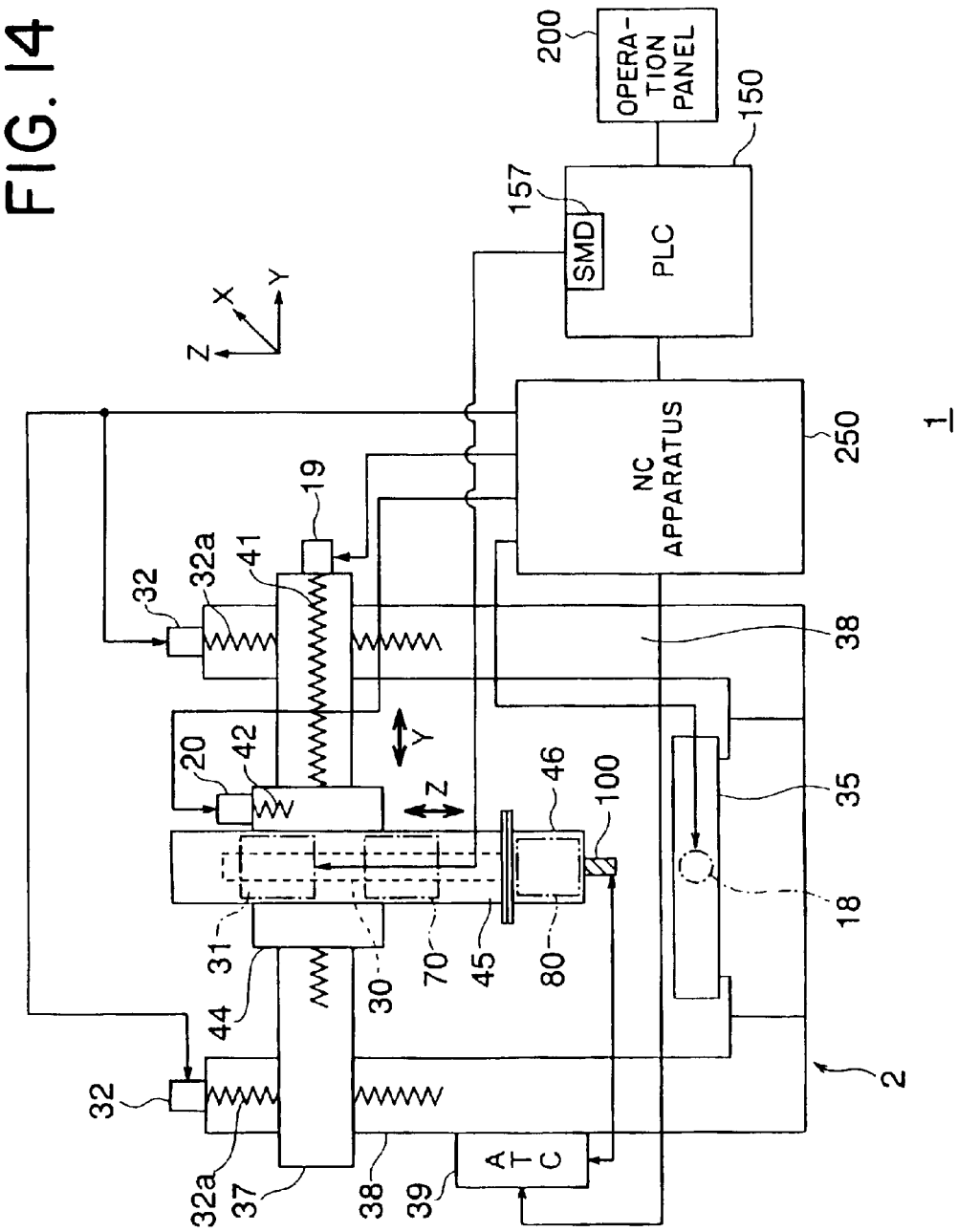
FIG. 14 is a view of the configuration of a machine tool according to a fifth aspect of the present invention.

FIG. 14 is a view of the configuration of a machining center according to a fifth embodiment of the present invention. Note that parts of the machining center shown in FIG. 14 the same as those of the machining center shown in FIG. 1 are assigned the same reference numerals.

The ram 45 holds the spindle 30 rotatably in it. Further, the ram 45 has built into it a spindle motor 31 for rotating the spindle 30 and has built into it a generator 70. Note that the detailed structure of the ram 45 will be explained later.

An attachment 46 is attached to the front end of the ram 45. The attachment 46 rotatably holds a tool 100 and includes a built-in motor 80 for rotating this tool 100. Note that the detailed structure of the inside of the attachment 46 will be explained later. Further, the attachment 46 is an embodiment of an attachment of the present invention.

The tool 100 is for example an end mill, drill, etc. held by a holder.

Figure 15:
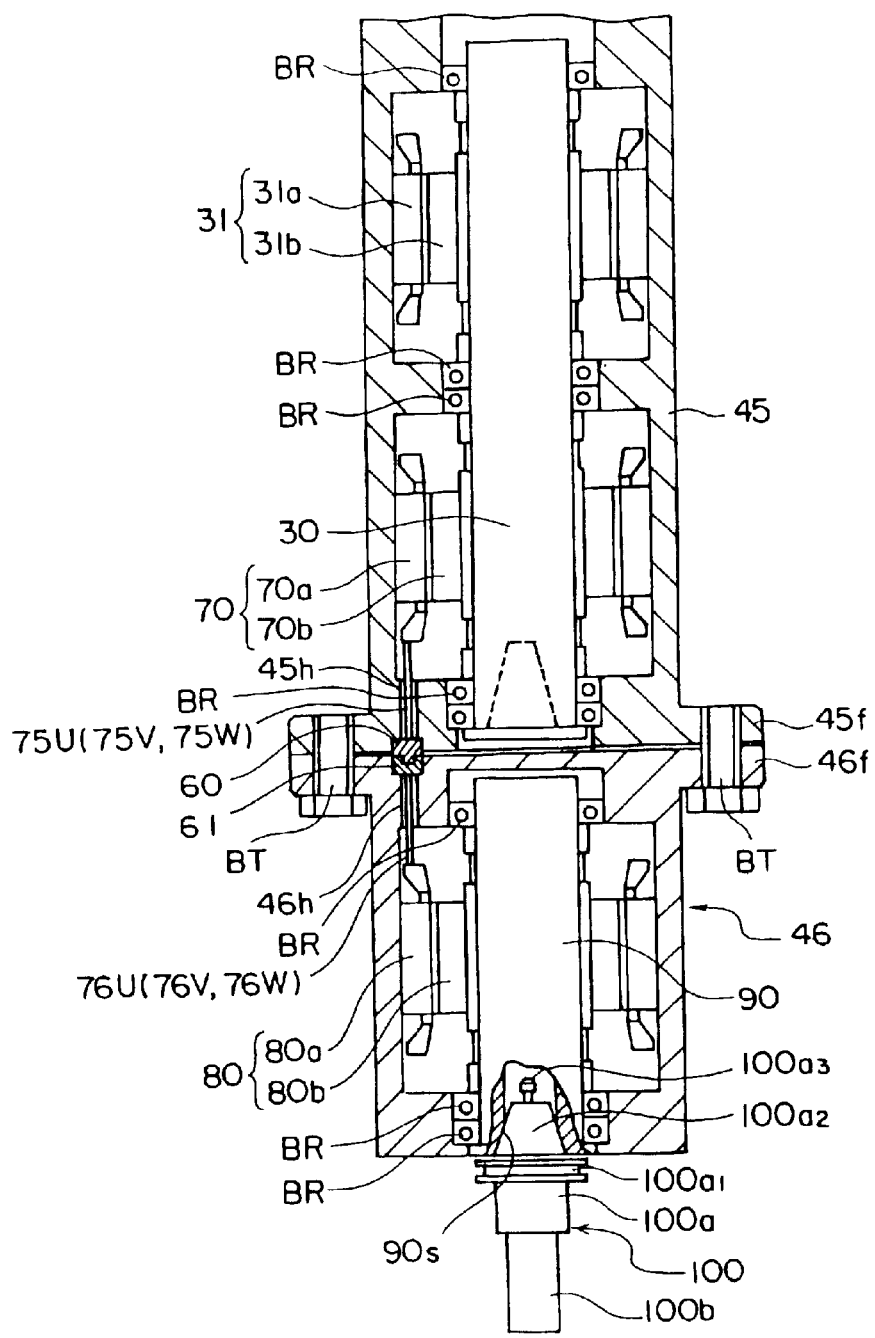
FIG. 15 is a sectional view of the internal structure of a ram and attachment of a machining center.

FIG. 15 is a sectional view of the structure of the inside of the ram 45 of the above machining center 1 and the attachment 46.

As shown in FIG. 15, the flange 45f formed at the bottom end of the ram 45 and the flange 46f formed at the top end of the attachment 46 are connected by a plurality of bolts BT. Note that it is also possible to attach an attachment other than the attachment 46 to the ram 45. When attaching another attachment to the ram 45, rotation of the spindle 30 built into the ram 45 can be transmitted to the attachment.

The ram 45 is shaped cylindrically. The spindle 30 is held rotatably at its inner circumference through a plurality of bearings.

The rotor 31b of the spindle motor 31 is fastened to the top end side of the spindle 30. Further, the stator 31a of the spindle motor 31 is fastened to a position facing the rotor 31b at the inner circumference of the ram 45.

The rotor 70b of the generator 70 is fastened to the bottom side of the spindle 30. Further, the stator 70a of the generator 70 is fastened to a position facing the rotor 70b at the inner circumference of the ram 45.

The generator 70 generates electric power by the rotation of the rotor 70b with respect to the stator 70a. As this generator 70, for example, a three-phase synchronous generator is used.

Connection terminals 60 are attached to the bottom end surface of the ram 45. Three of the connection terminals 60, as explained later, are provided corresponding to the three-phase alternating current generated by the generator 70.

The connection terminals 60 are arranged at equal intervals in the circumferential direction of the bottom end surface of the ram 45. The connection terminals 60 are formed by copper or other conductive materials.

The connection terminals are electrically connected to the conductor cables 75U, 75V, and 75W connected to the three-phase wiring of the stator 70b of the generator 70. The conductor cables 75U, 75V, and 75W are connected to the three-phase wiring of the stator 70b of the generator 70 and connection terminals 60 through insertion holes 45h formed at the bottom end of the ram 45.

A drive shaft 90 is rotatably held at the inner circumference of the attachment 46 through a plurality of bearings.

A taper sleeve 90s into which the taper shank 100a2 of the holder 100a of the tool 100 is formed at the bottom end of the drive shaft 90.

The holder 100a of the tool 100 holds a drill, end mill, or other cutting tool 100b at its bottom end.

Further, the holder 100a is provided with a grip 100a1 gripped by a changing arm of the above automatic tool changer 39 at its outer circumference.

A pull stud 100a3 is provided at the top end of the holder 100a. The pull stud 100a3 is clamped by a collet of a not illustrated clamping mechanism built in the drive shaft 90. Note that the clamping mechanism built in the drive shaft 90 is well known, so a detailed explanation will be omitted.

The rotor 80b of the motor 80 is fastened at the middle of the drive shaft 90 in the axial direction.

The stator 80a is fastened at a position facing the rotor 80b at the inner circumference of the attachment 46. The motor 80 rotates the drive shaft 90 by the supply of current to the winding of the stator 80a. As the motor 80, for example, a three-phase induction motor may be used.

Connection terminals 61 are provided at the top end of the attachment 46. The connection terminals 61 are provided at positions corresponding to the connection terminals 60 provided at the ram 45 side. The connection terminals 61 are for example formed by copper or other conductive materials.

The connection terminals 61 are electrically connected to the three-phase winding of the stator 80a of the motor 80 by the conductor cables 76U, 76V, and 76W inserted in the insertion holes 46h formed corresponding to the connection terminals 61 at the top end of the attachment 46.

Figure 16:
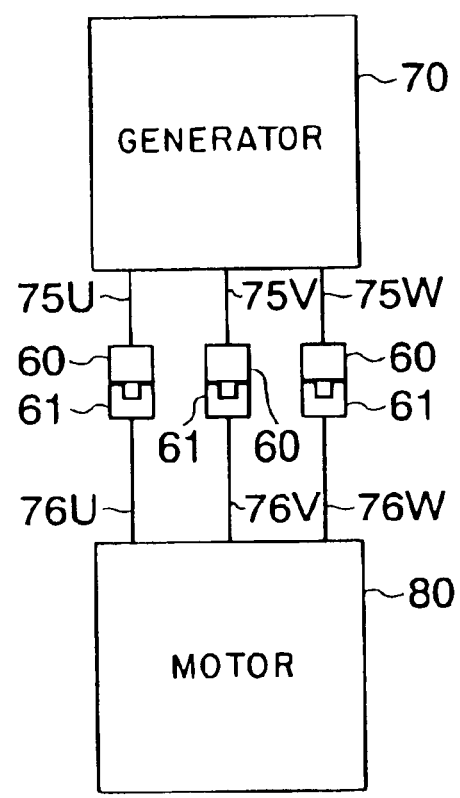
FIG. 16 is a view of the connection relationship between the generator and motor.

FIG. 16 is a view of the connection relationship between the generator 70 and the motor 80.

If the attachment 46 is attached to the ram 45, the connection terminals 60 and 61 are connected and the conductor cables 75U, 75V, and 75W connected to the generator 70 and the conductor cables 76U, 76V, and 76W connected to the motor 80 are connected to each other.

Due to this, three-phase electric power generated by the generator 70 can be supplied to the motor 80 through the connection terminals 60 and 61 and the conductor cables 75U, 75V, and 75W.

Next, an example of the operation of a machining center of the above configuration will be explained.

First, the attachment 46 is attached to the front end of the ram 45. By attaching the attachment 46 to the ram 45, the generator 70 built into the ram 45 and the motor 80 built into the attachment 46 are electrically connected.

Next, a desired tool 100 is attached to the attachment 46 by an automatic tool changer 39.

If rotating the spindle motor 31 by the rotational speed $N_0$ from this state, the spindle 30 rotates and the rotary force is transmitted to the generator 70.

Due to this, the generator 70 generates three-phase alternating current power when using for example a three-phase synchronous generator. The motor 80 is driven by the three-phase alternating current supplied from the generator 70.

By making the workpiece fastened to the table 35 and the tool 100 move relative to each other in accordance with the machining program, the workpiece is cut.

As explained above, according to the present embodiment, by building in a generator 70 in the ram 45 serving as the spindle housing and using the electric power generated at the generator 70 to drive the motor 80 built in the attachment 46, the rotational speed of the tool 100 is increased from that of the spindle 30. Therefore, even if rotating the spindle 30 at a high speed, there is no generation of heat as with a gear mechanism and a deterioration in the machining tolerance can be suppressed.

By suitably setting the ratio of the numbers of poles of the generator 70 and motor 80, the rotational speed of the tool 100 may be increased from, kept equal to, or reduced from the rotational speed of the spindle 30.

According to the present embodiment, since the tool 100 is driven by the electric power generated by the rotation of the spindle 30, there is no need to supply a drive current from an outside power supply to the attachment 46. As a result, there is no need for a cable for supplying current.

Note that the present invention is not limited to the above embodiment.

In the above embodiment, the explanation was made of the case of fastening the attachment 41 serving as the attachment of the present invention to the ram 45 serving as the spindle housing by bolts BT, but it is also possible to change attachments 46 by an automatic attachment changer.

Further, in the above embodiment, the explanation was made of the case of an attachment 46 including a built-in motor 80 and rotating the tool 100 as the attachment of the present invention, but the present invention is not limited to this. For example, it may also be a lighting device, a tool including a built-in motor, an electrodischarge machining electrode, a battery, or other device using the electric power of the generator 70.

While the invention has been described with reference to specific embodiments chosen for purpose of illustration, it should be apparent that numerous modifications could be made thereto by those skilled in the art without departing from the basic concept and scope of the invention.

What is claimed is:

1. A tool attachable to a spindle of a machine tool comprising:
    a machining tool for machining a workpiece;
    a motor connected to said machining tool and causing said machining tool to rotate; and
    a generator to which rotary force is transmitted from a spindle of said machine tool and generating electric power to drive said motor; wherein
    a shaft of said motor is arranged in an orientation different from an axial center of said spindle.

2. A tool as set forth in claim 1, provided with a plurality of said motors and machining tools.

3. A tool as set forth in claim 1, further comprising:
    an attachment part attachable to said spindle and transmitting rotary force of said spindle to said motor and
    a case for holding said motor and generator, rotatably holding said attachment part, and engaging with a non-rotating portion of said machine tool so as to be restricted from rotation.

4. A tool as set forth in claim 1, wherein
    said generator is an alternating current generator which supplies voltage of a frequency in accordance with the rotational speed of said spindle to the motor, and
    said motor is an induction motor rotating by said rotational speed in accordance with a frequency.

5. A tool holder able to hold a machining tool for machining a workpiece and attachable to a spindle of a machine tool body, comprising:
    a tool holding part for rotatably holding said machining tool;
    a motor for rotating said tool holding part; and
    a generator to which rotary force is transmitted from a spindle of said machine tool and generating electric power to drive said motor; wherein
    a shaft of said motor is arranged in an orientation different from an axial center of said spindle.

6. A tool holder as set forth in claim 5, provided with a plurality of said motors and tool holding parts.

* * * * *